(12) United States Patent
Suzuki

(10) Patent No.: US 6,603,930 B2
(45) Date of Patent: Aug. 5, 2003

(54) CAMERA

(76) Inventor: Hitoshi Suzuki, 7-5 Inomiya-cho, Shizuoka (JP)

(*) Notice: Subject to any disclaimer, the term of this patent is extended or adjusted under 35 U.S.C. 154(b) by 0 days.

(21) Appl. No.: 10/155,014

(22) Filed: May 28, 2002

(65) Prior Publication Data

US 2002/0197070 A1 Dec. 26, 2002

(30) Foreign Application Priority Data

Jun. 20, 2001 (JP) ........................................ 2001-185693
Apr. 23, 2002 (JP) ........................................ 2002-120137

(51) Int. Cl.$^7$ ........................ G03B 13/24; G03B 17/44; H04N 7/18; H04N 5/225
(52) U.S. Cl. ........................ 396/144; 396/151; 396/429; 396/535; 396/411; 348/64; 348/345; 348/374
(58) Field of Search ................. 396/151, 429, 396/535, 541, 144, 411; 348/64, 345, 374

(56) References Cited

U.S. PATENT DOCUMENTS 1,900,730 A * 3/1933 Petit et al. .................. 396/151
5,570,146 A * 10/1996 Collette ....................... 396/429
6,404,991 B2 * 6/2002 Gfeller ......................... 396/429

* cited by examiner

Primary Examiner—W. B. Perkey
(74) Attorney, Agent, or Firm—Kanesaka & Takeuchi

(57) ABSTRACT

In a camera, a main body is provided with a rotating member, which is rotated along a guide of the main body, and the rotating member is connected with an operating device for rotating the rotating member. A focusing screen is mounted to the rotating member so as to correspond to a luminous flux section of a lens unit. A reflecting member for reflecting a subject image captured from the lens unit to a finder provided in the main body is mounted at a backside of the focusing screen in the rotating member. A case member containing an image pickup member corresponding to the luminous flux section of the lens unit is provided at the other side of the focusing screen via the reflecting member in the rotating member.

8 Claims, 26 Drawing Sheets

(a)

(b)

(c)

CAMERA

BACKGROUND OF THE INVENTION

1. Field of the Invention

The present invention relates to a camera, which has a compact structure, and can take a photograph without losing a large format view camera function.

2. Description of the Related Art

Conventionally, photography has been carried out using a large format picture size film, e.g., a 4×5 inch format and a 5×7 inch format, or a medium format picture size film, e.g., a 6×7 cm format and a 6×9 cm format. That is, in the case of carrying out lens movement photography such that precise description is required, correction on a distortion of subject image is made and a range of focal point is widened, a large format (medium format) view camera (technical view camera) 170 as shown in FIGS. 25(a), 25(b) has been used. In the large format view camera 170, a focusing screen (glass) 173 is situated on the same position as a plane (surface) of film 175. Therefore, a user (photographer) determines a composition while directly seeing an image projected directly on the position, focuses the camera, and thereafter, takes a photograph of the image.

In the above large format view camera 170, first, a camera main body 172 is fixed by a tripod prior to photography of a subject 171. Thereafter, as shown in FIG. 25(a), a composition setup of the subject 171 passing through a lens 174 and a focusing adjustment are carried out in the focusing screen 173 contained in a focusing screen unit 177 movably mounted to the camera main body 172. Thereafter, as shown in FIG. 25(b), a film holder 176 containing a film 175 is inserted between the camera main body 172 and the focusing screen unit 177, and thereafter, photography is carried out. Moreover, as shown in FIG. 25(c), in the case of mounting a film holder 179 containing a roll film 178 to the camera main body 172, the focusing screen unit 177 is detached from the camera main body 172, then, the film holder 178 is attached to the camera main body 172, and thereafter, photography is carried out.

Thus, in the large format view camera 170, the film holder 176 (179) must be attached to and detached from the camera main body 172 every one-time photography of the subject; for this reason, the attachment and detachment of the film holder is very troublesome, and a quick photographing performance is very low. Further, the image of the subject 171 projected on the focusing screen 173 becomes converse in the top and bottom of the subject; for this reason, it is difficult to adjust the composition, and as a result, the large format view camera 170 is not handy to use.

Moreover, unless the above removable type large format view camera is carefully handled, the focal point and composition thus confirmed change when the film holder 176 (179) is mounted to the camera main body; as a result, a photographic accuracy is reduced. In addition, after the film is loaded, it is difficult to make focusing by the focusing screen 173, and to confirm the composition.

The large format view camera can freely control a lens back (i.e., distance between rear lens and film) On the contrary, a single-lens reflex camera has a mirror box interposed between a structural lens and a film; for this reason, the lens back (i.e., distance between rear lens and film) needs to keep a predetermined distance or more.

Thus, in the case where a focal length of an interchangeable lens is shorter than the lens back, various restrictions on lens design are made. For this reason, the lens structure becomes complicated as compared with a large format view camera lens and a range finder lens; as a result, it is difficult to produce a high-performance lens.

Further, the single-lens reflex camera is superior to the above large format view camera in a quick photographing performance and operability; however, in the case of carrying out special photography such as lens movement, the single-lens reflex camera has some restrictions.

More specifically, in the case of carrying out the above special photography such as lens movement using an ordinary single-lens reflex camera, a lens movement mechanism such as bellows is required between lens and camera main body. In the case of using the above lens movement-only adapter, an adapter is interposed between lens and camera main body; for this reason, a flange back is elongated. As a result, an ordinary interchangeable lens does not have infinite focus, and only close-up photography is possible.

Further, the single-lens reflex camera has only image circle necessary for normal photography; for this reason, a vignette (vignetting) occurs (i.e., when a too longer hood is mounted, the distal end of the hood projects on the extreme end of screen; as a result, the extreme end of screen becomes black). For this reason, a lens for only lens movement photography is required. The kind of lens movement-only lens (lens movement mechanism built-in lens) is less, and there is a restriction in its lens movement function and amount as compared with the large format view camera.

When carrying out lens movement photography using the single-lens reflex camera, there is the case where the subject is not fully confirmed on a finder.

That is, as shown in FIG. 26(a), there is the case where a part of light passing (transmitting) through a lens 181 and incident on a film plane 184 is not reflected on a mirror 182 depending upon lens movement position and amount of the movement. For this reason, no entire image of the subject exposed on the film plane 184 appears in a focusing screen 183. As a result, a shadow is generated in the upper side of the screen on the finder although the image is projected on the film plane, and thereby, a phenomenon (short of mirror length) M incapable of confirming the entire subject is generated.

Further, as shown in FIG. 26(b), there is the case where the following phenomenon is generated; more specifically, the light passing through the lens 181 is incident directly upon the focusing screen 183 from the lens 181 without being reflected by the reflecting mirror 182, and then, is imaged.

For this reason, in the photography incapable of allowing a failure, in the case of a film holder interchangeable camera, in order to previously confirm the subject projected on the film plane, the film holder is interchanged with a Polaroid film holder or a digital camera back, and thereafter, test photography is carried out. Further, in a state that the focusing screen is attached to the film plane, the subject is confirmed as the large format view camera.

SUMMARY OF THE INVENTION

The present invention has been made in order to solve the above problems. Therefore, an object of the present invention is to provide a camera having the following structure. In the camera, a main body is provided with a rotating member, which is rotated along a guide of the main body, and the rotating member is connected with an operating means for rotating the rotating member. A focusing screen is mounted to the rotating member so as to correspond to a luminous flux section of a lens unit. A reflecting member for reflecting a subject image captured from the lens unit to a finder provided in the main body is mounted at a backside of the focusing screen in the rotating member. A case member containing an image pickup member corresponding to the luminous flux section of the lens unit is provided at the other side of the focusing screen via the reflecting member in the rotating member.

According to the above construction of the present invention, it is possible to provide a camera, which has a compact-sized structure, and can perform the same photography effect as a large format view camera and high operability even if it is a small size.

BRIEF DESCRIPTION OF THE DRAWINGS

The above an further objects an features of the present invention will become more fully apparent from the following detailed description with reference to the accompanying drawings in which.

DETAILED DESCRIPTION OF THE PREFERRED EMBODIMENTS

Figure 1:
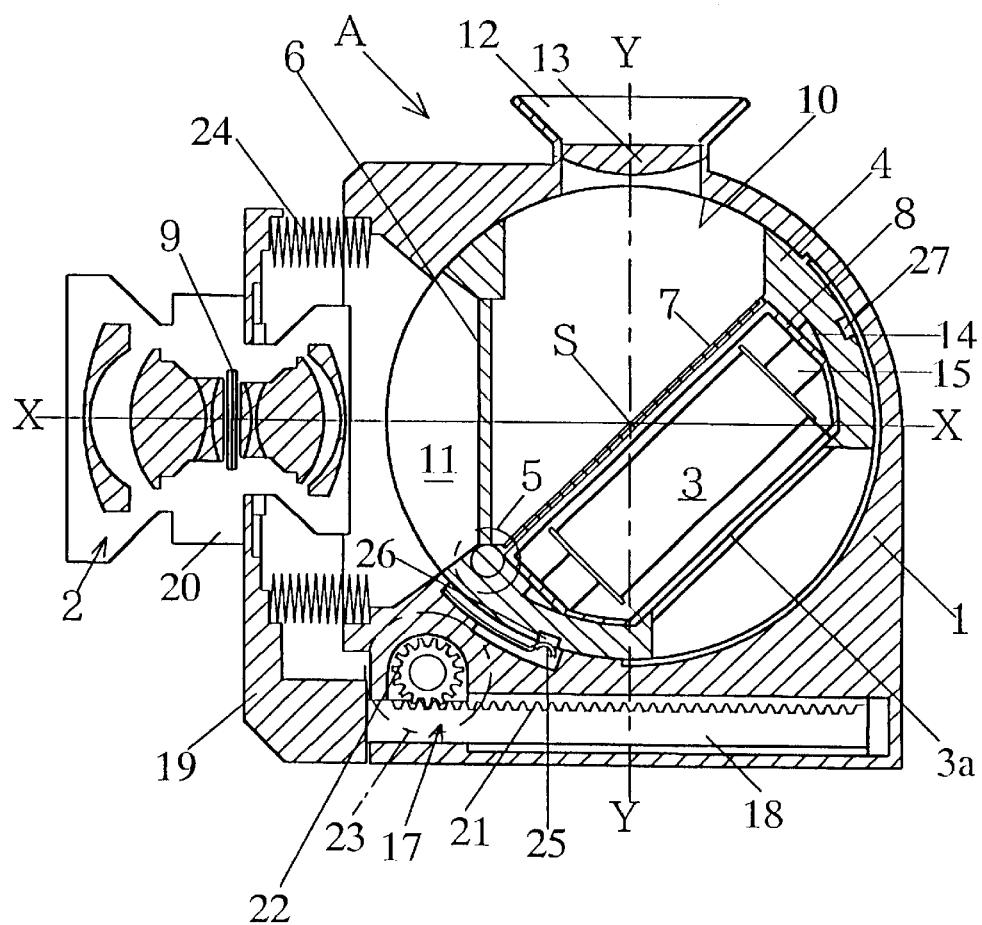
FIG. 1 is a longitudinal sectional side view showing a camera according to a first embodiment of the present invention, and shows a composition and focusing state.
Figure 2:
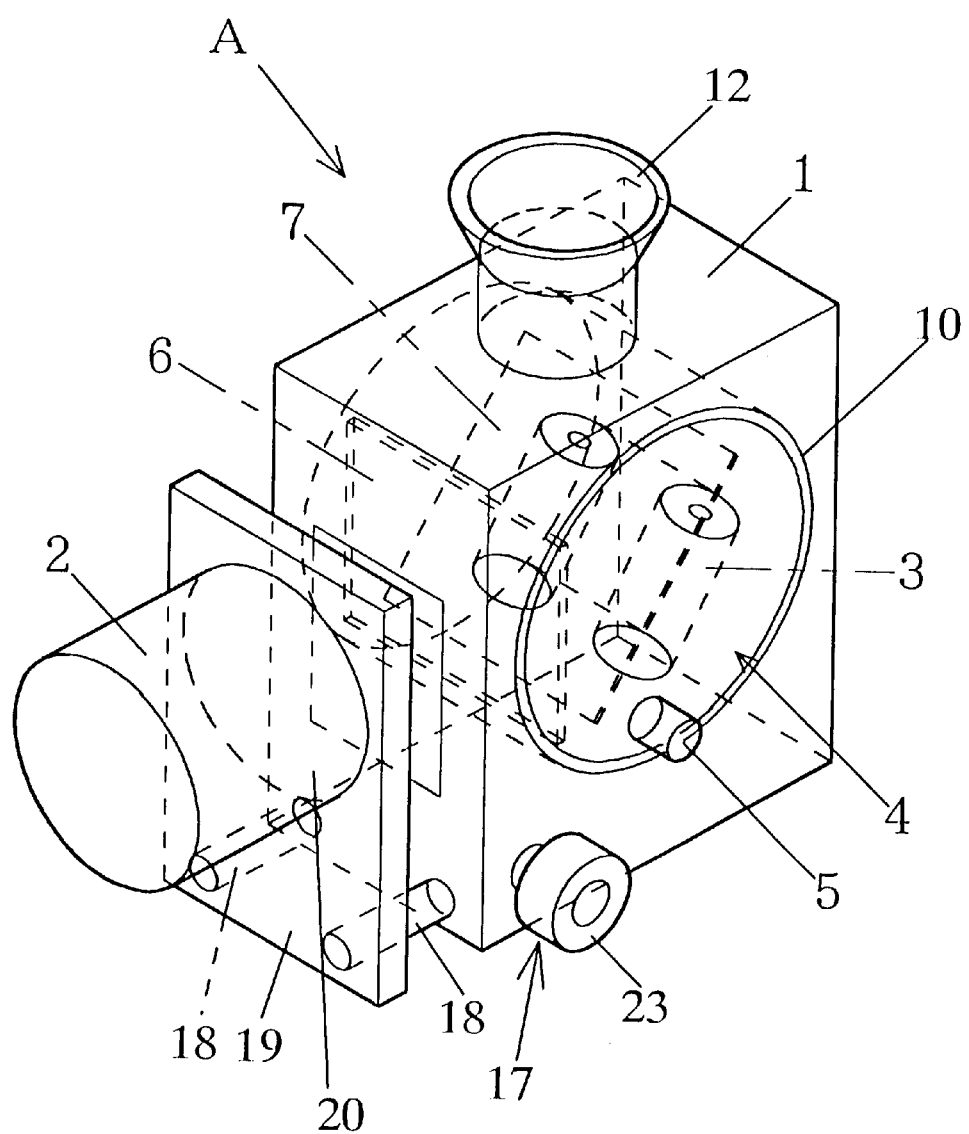
FIG. 2 is a schematic perspective view showing the camera shown in FIG. 1.

The preferred embodiments of the camera according to the present invention will be described below with reference to the accompanying drawings.

First Embodiment

In FIG. 1 to FIG. 5, FIG. 7 to FIG. 15 and FIG. 17 to FIG. 24, a reference numeral A denotes a camera. The camera A comprises a main body 1 formed of a solid material, a lens unit 2 mounted to one side of the main body 1, and an image pickup member 3, which is built in the main body 1 and images a subject image captured in the main body 1 passing through the lens member 2.

The camera A shown in FIG. 1 to FIG. 5 shows the first embodiment of the present invention. The main body 1 is basically composed of a rotating member 4, an operating means 5, a focusing screen 6, a reflecting member 7 and a case member 8.

In this case, the lens unit 2 projects an optically clear image on the image pickup 3 plane, and further, includes an aperture mechanism (not shown) and a shutter means 9.

The rotating member 4 is formed into a cylindrical shape, and further, is provided in the main body and rotated around the center S along a cylindrical guide 10 of the main body 1. The center S is set on the center line X—X passing through the lens unit 2.

The above operating means 5 is connected with the rotating member 4 so that the rotating member 4 can be rotated to forward or backward direction in a predetermined angle of rotation. Further, the operating means 5 is an operating knob provided at a proper portion of the rotating member 4, and also, may be driven by an electric motor (not shown).

Figure 16:
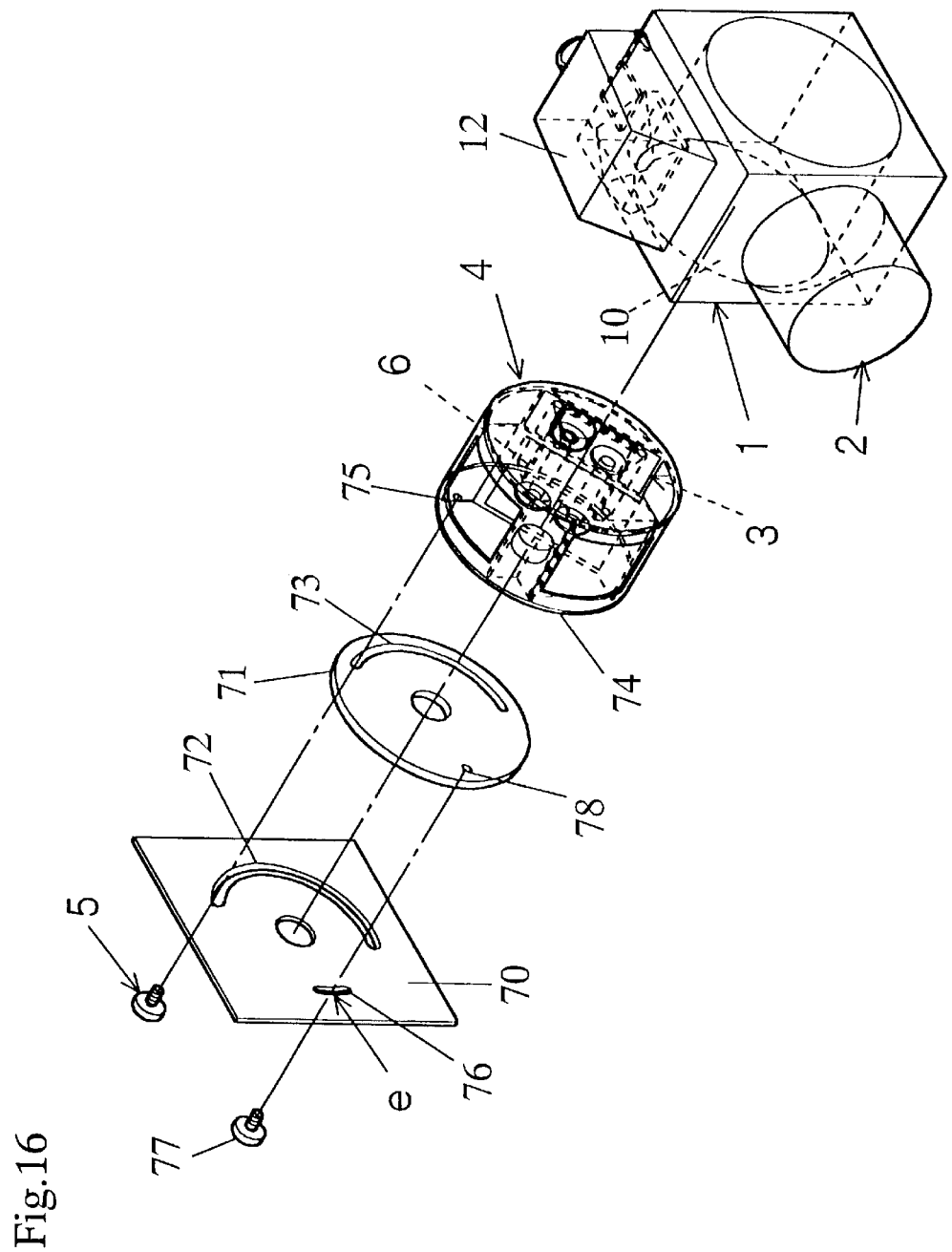
FIG. 16 is a schematic perspective view showing a structure of a rotating member in the camera shown in FIG. 1 and a second lens movement mechanism.

In the case of rotating the rotating member 4, as shown in FIG. 16, a movable member 71 is interposed between a main body side plate 70 fixedly attached to one side of the main body 1 and the rotating member. Further, the main body side plate 70 and the rotating member 4, that is, the movable member 71 are formed with circular arc slots 72 and 73 having a length corresponding to a rotating range of the rotating member 4, respectively. In this case, the circular arc slots 72 and 73 are concentric with the center S of rotation of the rotating member 4. The knob-like operating means 5 with male screw is inserted into the circular arc slots 72 and 73, and then, the male screw of the operating means 5 is screwed into a female hole 75 formed in a rotating member side plate 74 provided on one side of the rotating member 4.

Therefore, the rotating member 4 is arbitrarily rotated within a range of the circular arc slots 72 and 73 by operating the operating means 5, and further, the male screw is fastened into the female screw hole 75, and thereby, the rotating member 4 is fixed at an arbitrary position of the main body 1.

The above focusing screen 6 is mounted to the rotating member 4 in an approximately vertical state. The focusing screen 6 corresponds to a luminous flux section 11 of the lens unit 2 in the case where the user determines a composition in the subject photography and carries out a focusing operation, and is used to visually confirm an image projected passing through the lens unit 2. Further, the focusing screen 6 is rotated and moved within a predetermined angle of rotation integrally with the rotation of the rotating member 4.

The above reflecting member 7 is mounted to a rear side of the focusing screen 6 in the rotating member 4. The reflecting member 7 reflects a subject image captured from the lens unit 2 to a finder 12 provided in the main body 1. For example, a flat-plate mirror, prism and the like may be used as the reflecting member 7.

Further, the reflecting member 7 is mounted at an inclination angle of 45° to the focusing screen 6 provided approximately vertical in the case where the user determines a composition in the subject photography and carries out a focusing operation. In the case of mounting the reflecting member 7 at the inclination angle of 45°, the center of the reflecting member 7 is set so as to align with the center S on the center line X—X passing through the lens unit 2.

The above finder 12 is provided with an eyepiece lens 13, and is positioned on the line Y-Y connecting the center of the eyepiece lens 13 and the above center S; in this case, the line Y-Y is perpendicular to the line X—X.

The above case member 8 is arranged on the rear side of the focusing screen 6 via the reflecting member 7 in the rotating member 4, and contains an image pickup member 3 corresponding to the luminous flux section 11 of the lens unit 2 in the subject photography.

Further, the case member 8 is freely removable from a holder portion 14 of the rotating member 4 so that the image pickup member 3 such as a film contained therein can be taken out and changed. There is the case where the case member 8 is not used as the need arises; therefore, in this case, the image pickup member 3 is directly mounted to the rotating member 4.

In addition, the image pickup member 3 may be a film type having an emulsion layer (coating) at its one side, and an image pickup device (for digital camera) such as a semiconductor device converting an optical video signal into an electrical signal. In the case of the image pickup device type, a proper memory medium (not shown) is removably provided in the main body 1 or the rotating member 4, and then, the picked-up image signal is transmitted and stored in the memory medium.

In the above film type, a roll film and a sheet film may be used. In the case of the roll film, it is convenient to employ a winding-up system capable of winding up the roll film from one of the film to the other thereof in photography. The roll film includes medium format picture side film, e.g., a 6×4.5 cm format, a 6×7 cm format and a 6×9 cm format, as well as a 35 mm small format film.

On the other hand, the sheet film includes a large format picture size film in general, e.g., a 4×5 inch format and a 5×7 inch format, or a 6×7 cm format and a 6×9 cm format.

Moreover, an image pickup member plane 3a receives an image from the lens unit 2. Further, when the rotating member 4 is rotated and corresponds to the luminous flux section 11 in the lens unit 2, the plane 3a is positioned so that the plane 3a approximately coincides with the position of the focusing screen 6 situated in the case of determining a composition in the subject photography and carrying out a focusing operation. That is, the image pickup member plane 3a is situated on the same position as the focusing screen 6 with respect to the luminous flux section 11 changing its position by the rotation of the rotating member 4.

Figure 5:
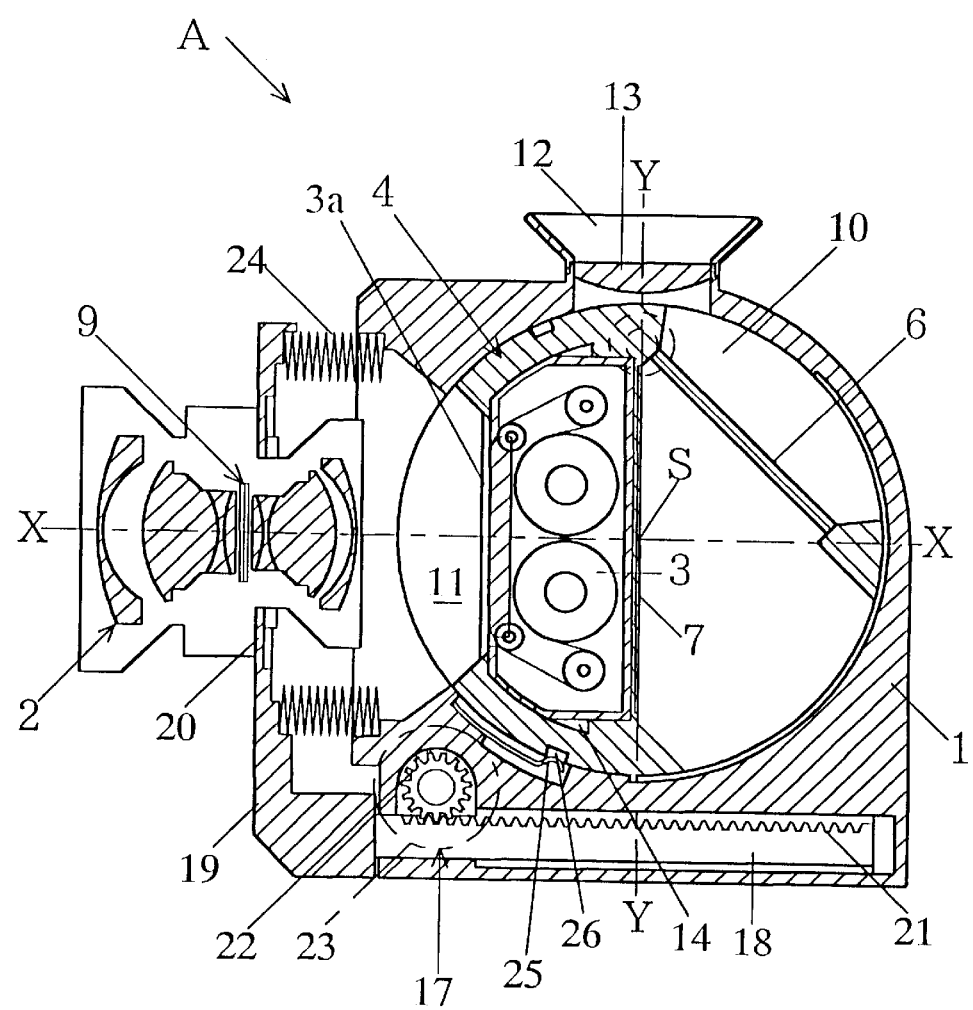
FIG. 5 is a longitudinal sectional side view showing another film winding-up example in an image pickup member of the camera shown in FIG. 1.
Figure 6:
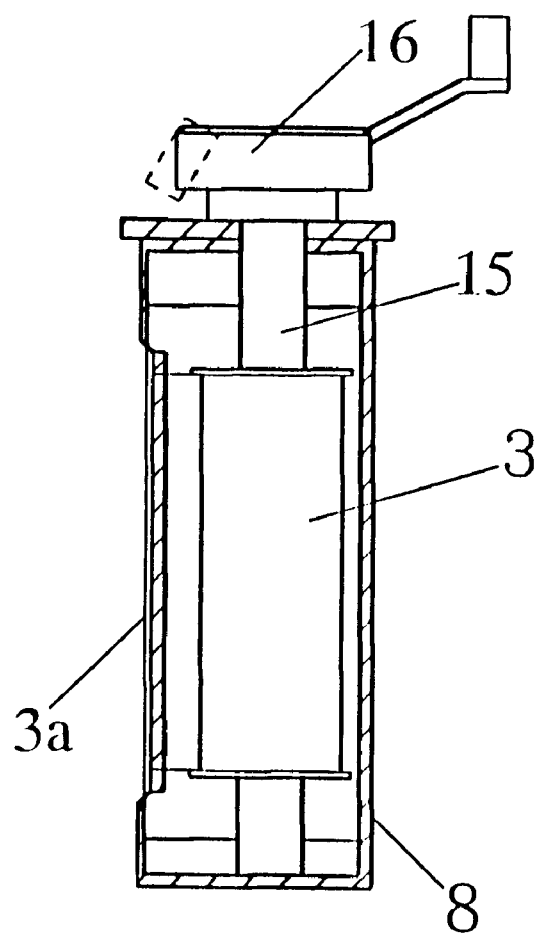
FIG. 6 is a sectional view showing a case member containing the image pickup member of the camera shown in FIG. 1.

A wind-up direction of the image pickup member 3 includes the following cases. More specifically, one is the case where the wind-up is carried out in a horizontal (right and left) direction to the front side of photography direction as shown in FIG. 1 to FIG. 4. Another is the case where the wind-up is carried out in a vertical direction to the front side of photography direction as shown in FIG. 5. In any case, as shown in FIG. 6, the above wind-up of the image pickup member 3 is carried out by a wind-up crank 16 attached to one or the other of a wind-up shaft 15. Further, the image pickup member 3 may be automatically wound up by a motor and the like.

In FIG. 1 to FIG. 3 and FIG. 5, a reference numeral 17 denotes a focusing means, which reciprocates the lens unit 2 with respect to the main body 1 so that a focusing operation is performed. An actuating member 18 reciprocating on one side or both sides is fitted into the lower portion of the main body 1, and a frame 19 is projected from the outer end portion of the actuating member 18. A holding member 20 holding the lens unit 2 is supported by the frame 19 so that it can be held.

Further, a pinion gear 22 is engaged with a rack 21 formed on the actuating member 18, and thereafter, the pinion gear 22 is rotated by operating a control knob 23, and thereby, the actuating member 18 is reciprocated so that a focus imaged on the focusing screen 6 changes.

In this case, for example, the focusing means 17 may be a helicoid type interposed between the lens unit 2 and the main body 1 as shown in FIG. 17 and the like.

Further, a cover member 24 such as bellows having flexibility may be mounted between the holding member 20 of the lens unit 2 and the front surface of the main body 1.

When the focusing screen 6 and the image pickup member plane 3a are rotated by the operating means 5, the rotating member 4 is positioned so as to correspond to the lens unit 2. In this case, the rotating member 4 is accurately positioned by selective engagement of an engaging member 25 such as elastic mechanism provided in the main body 1 with stoppers 26 and 27 such as recess formed in the rotating member 4.

Therefore, according to this first embodiment of the present invention, the camera A having the above structure makes the following operation.

The non-image pickup member 3 is previously contained in the case member 8, and then, the case member 8 is fitted into the holder portion 16 of the rotating member 4. Thereafter, the rotating member 4 is rotated by operating the operating knob 5 so that the focusing screen 6 corresponds to the lens unit 2 side as shown in FIG. 1.

In this case, the focusing screen 6 and the image pickup member 3 are mounted to the rotating member 4 with a phase difference. That is, when the rotating member is rotated around the center S of rotation to a clockwise or counter-clockwise direction within a predetermined angle of rotation (e.g., range from 90° to 180°), the focusing screen 6 and the image pickup member 3 are selectively correspondent to the luminous flux section 11.

In this state, the camera A is installed so as to correspond to the subject, and then, the subject image is passed through the lens unit 2 and transmitted to the focusing screen 6. The image transmitted to the focusing screen 6 is projected on the reflecting member 7, and is confirmed via the eyepiece lens 13 of the finder 12. In this case, the image is an erect image, which is not converse in the top and bottom of the image; therefore, the user is easy to determine the composition of the subject and carry out a focusing operation by the focusing means 17. Thus, the user carries out the above operation, and sets up a desired photographic condition.

After the desired photographic condition is set up, in this state, the user closes the shutter 9 of the lens unit, and rotates only rotating member 4 by the operating means 5 so that the image pickup member plane 3a of the image pickup member 3 corresponds to the lens unit 2 side.

Moreover, the luminous flux section 11 of the focusing screen 6 previously positioned approximately coincides with the luminous flux section 11 of the image pickup member plane 3a. Therefore, the image set and confirmed via the finder 12 and the image formed on the image pickup member plane 3a are accurately projected without causing an error in distance.

Figure 3:
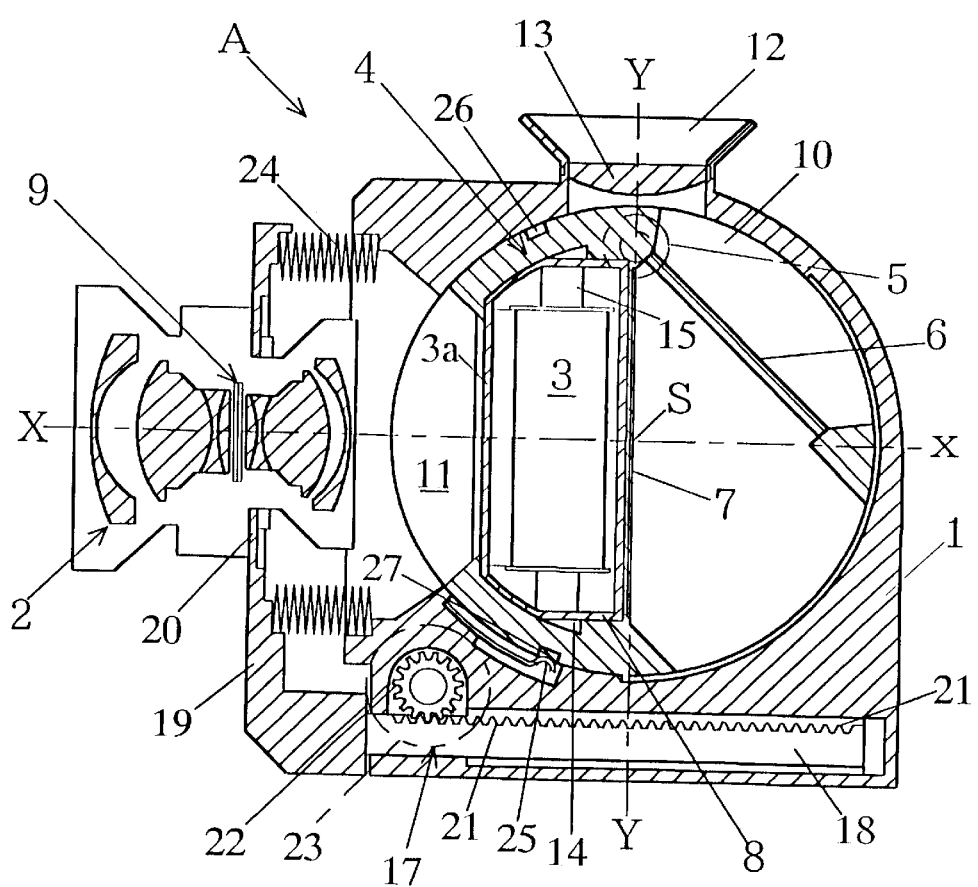
FIG. 3 is a longitudinal sectional side view showing a state just before photography is carried out in the camera shown in FIG. 1.
Figure 4:
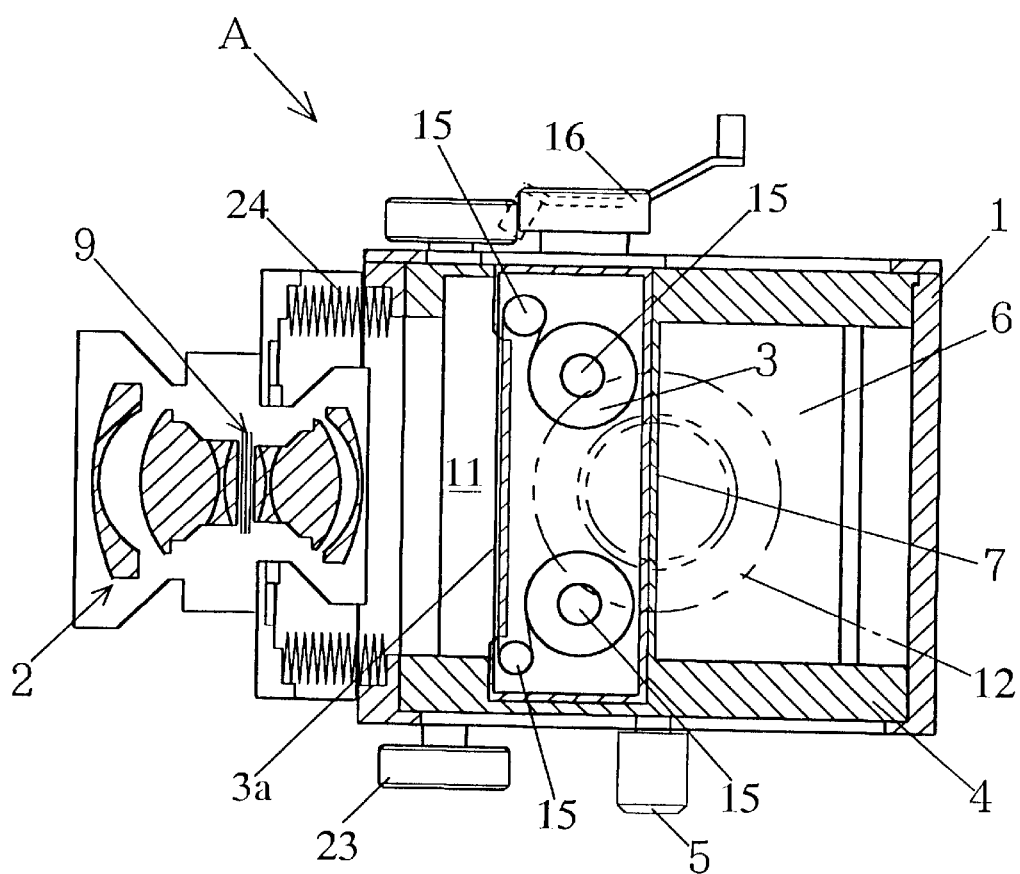
FIG. 4 is a transverse sectional plan view showing the camera shown in FIG. 2.

As shown in FIG. 3, when the user presses the shutter 9, the subject passing through the lens unit 2 is imaged on the image pickup member plane 3a via a predetermined exposure.

Therefore, even if the medium or large format picture size image pickup member 3 is used, there is no time and labor to spend for changing or removing a film back every one-time photography like the conventional case, and thereby, it is possible to speedy take a photograph of the subject, and to greatly improve a quick photographing performance.

Figure 7:
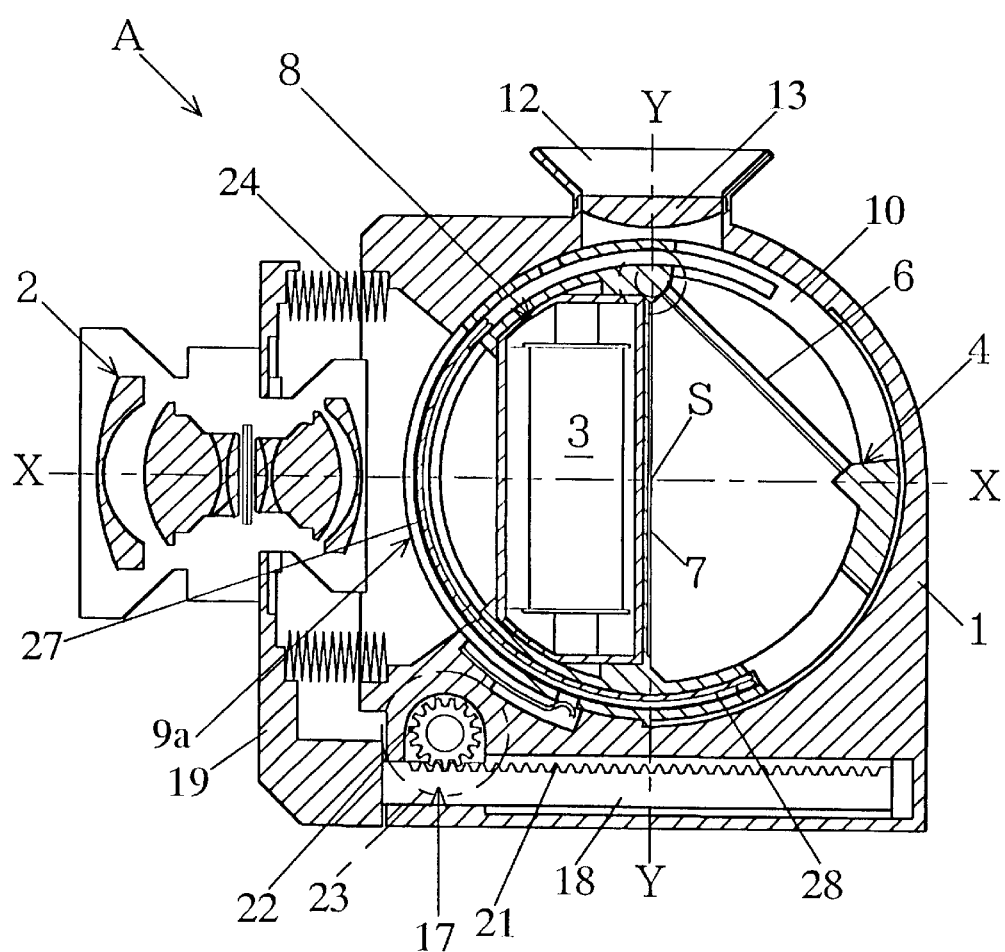
FIG. 7 is a longitudinal sectional side view to explain a focal plane shutter mechanism of the camera shown in FIG. 1.

In this first embodiment, as shown in FIG. 7, a focal plane shutter means 9a comprising front and back curtains may be employed as the shutter mechanism. The main body 1 is provided with a shutter control unit (not shown).

Second Embodiment

FIG. 8 to FIG. 11 shows a camera A according to a second embodiment of the present invention. The camera A of this second embodiment differs from the above first embodiment in the following points. That is, the camera A of the second embodiment has a structure in which the lens unit 2 is provided with a first lens (camera) movement mechanism d for shifting the lens unit 2 to a vertical (rise) direction or to a front and back rotating (tilt) direction. Further, in the main body 1, other members, that is, the rotating member 4, the operating means 5, the focusing screen 6, the reflecting member 7 and the case member 8 has the same structure as the above first embodiment. Therefore, the identical reference numerals are used to designate the same member as the first embodiment, and the details are omitted.

Figure 8:
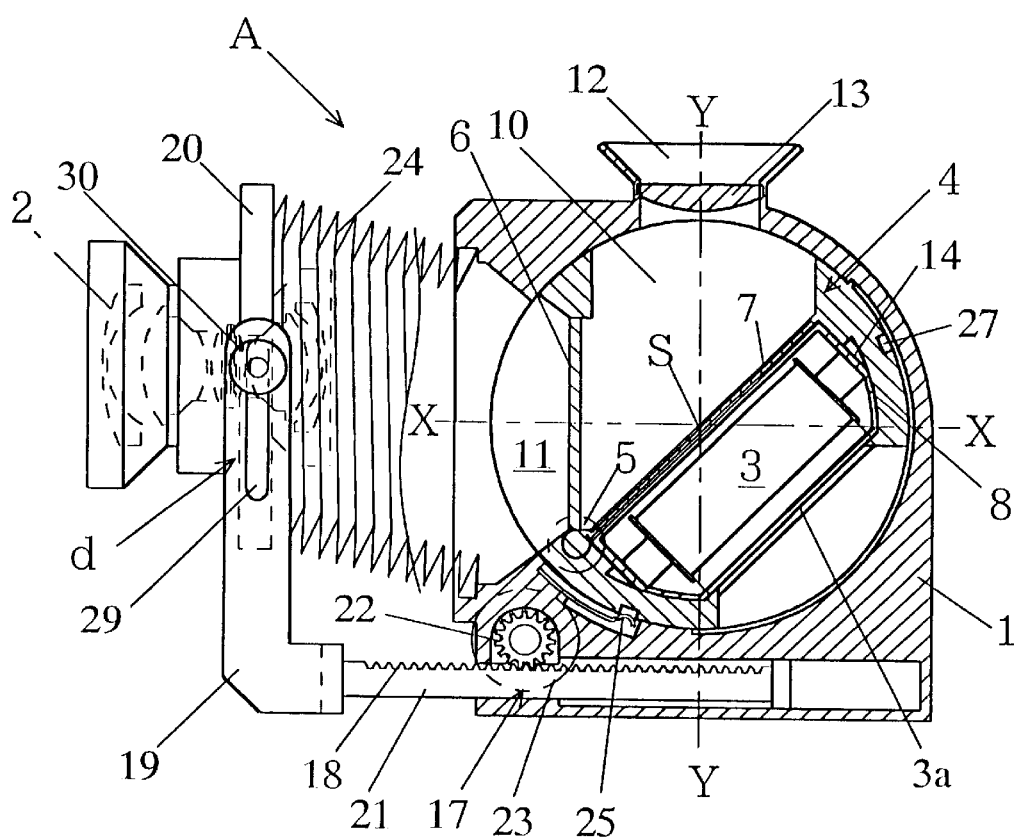
FIG. 8 is a longitudinal sectional side view showing a camera according to a second embodiment of the present invention, and shows a rise adjusting state.
Figure 9:
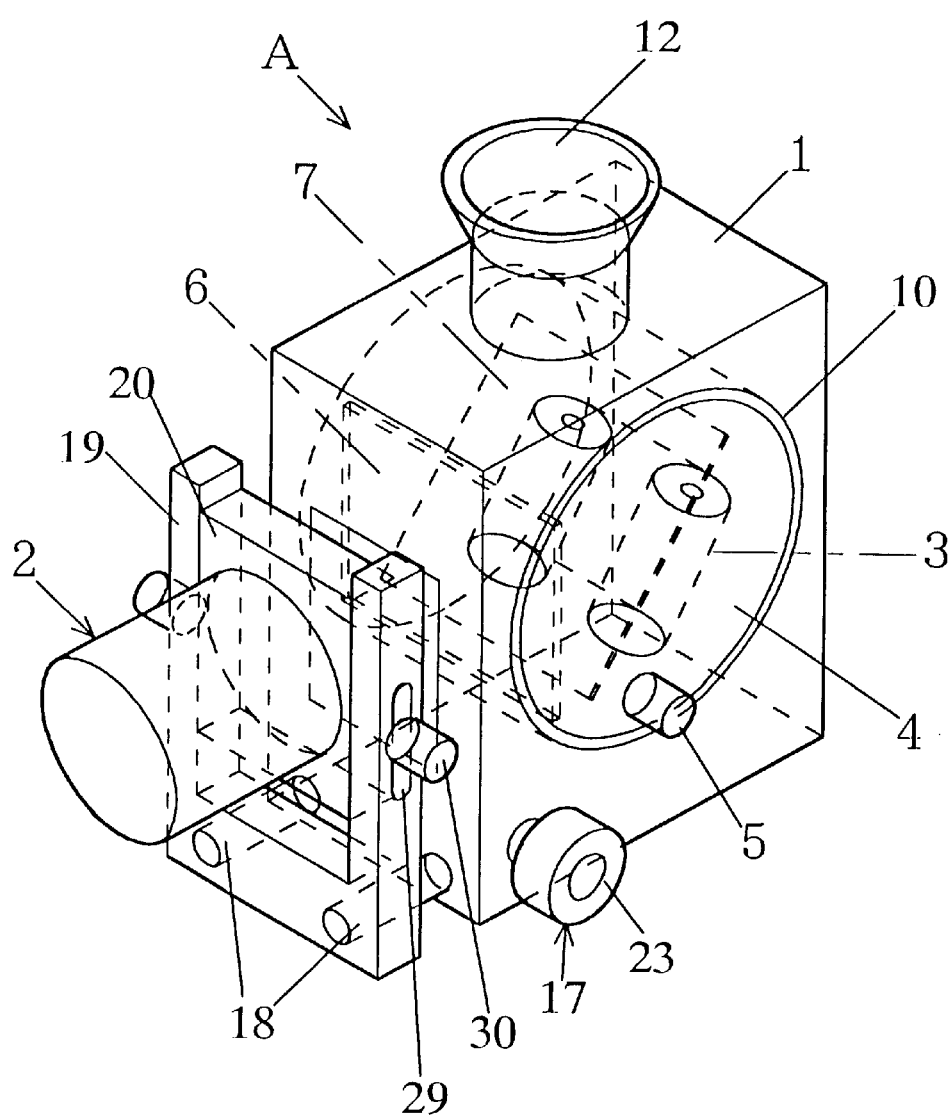
FIG. 9 is a schematic perspective view showing the camera shown in FIG. 8.
Figure 10:
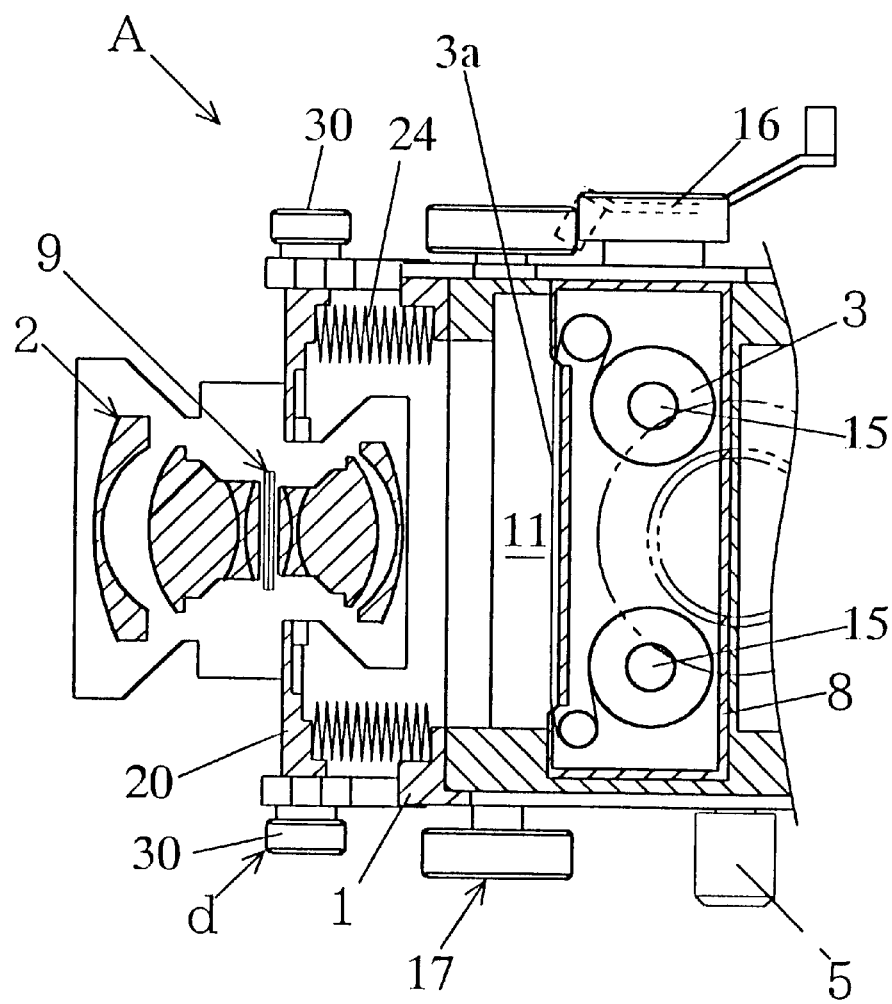
FIG. 10 is a transverse sectional plan view showing principal parts of the camera shown in FIG. 8.

The above first lens movement mechanism for shifting the lens unit 2 to the vertical (rise) direction is as follows. More specifically, the holding member 20 holding the lens unit 2 is fixed to the frame 19 by a fastening means 30 such as a screw with knob. The fastening means 30 is slidable in a longitudinal long slot 29 formed in the frame 19. The fastening means 30 is loosened, and thereby, as shown in FIG. 8, the holding member 20 is freely moved in the vertical (rise) direction. By doing so, in the case of photographing buildings and the like, it is possible to correct a perspective difference caused by magnification difference in low angle and high angle photography.

Figure 11:
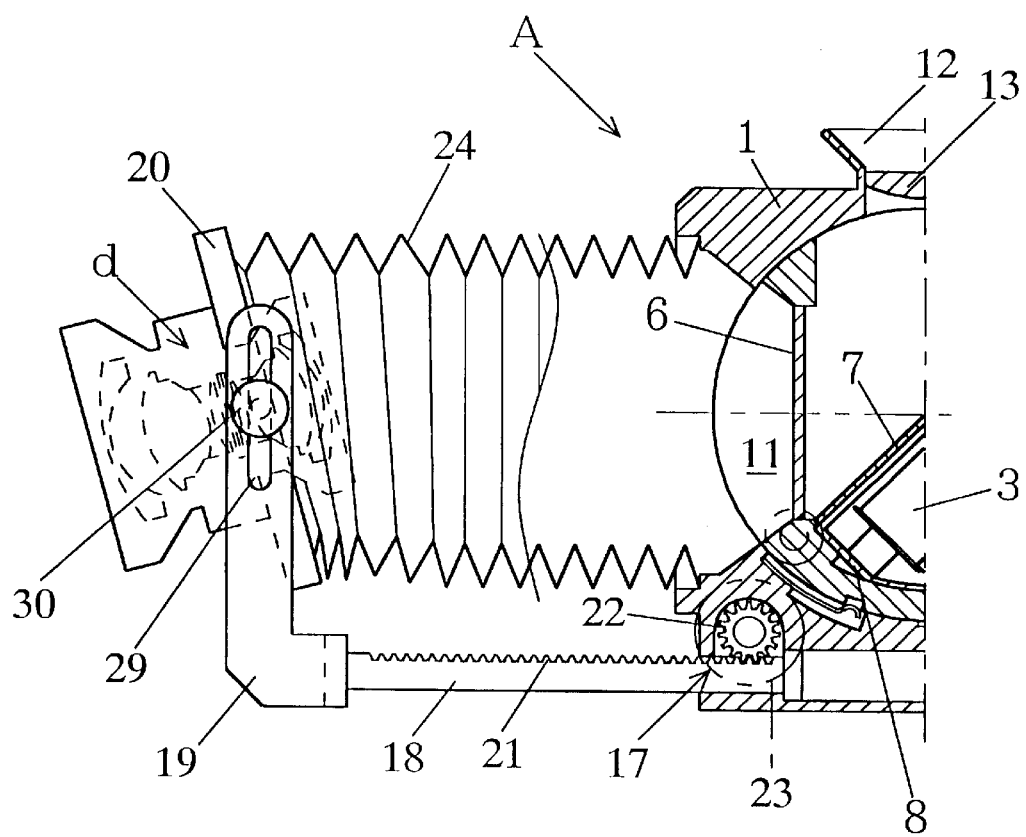
FIG. 11 is a longitudinal sectional side view of principal parts showing a tilt adjusting state in the camera shown in FIG. 8.

On the other hand, the above lens movement mechanism for shifting the lens unit 2 to the front and back rotating (tilt) direction is as follows. More specifically, as shown in FIG. 11, the holding member 20 is freely rotated around the fastening means 30. As a result, a depth of field is enlarged; therefore, it is effective in close-up photography.

The camera A can use a large size lens and obtain a large image circle; therefore, it is possible to obtain a greater lens movement effect as compared with the conventional camera.

Figure 12:
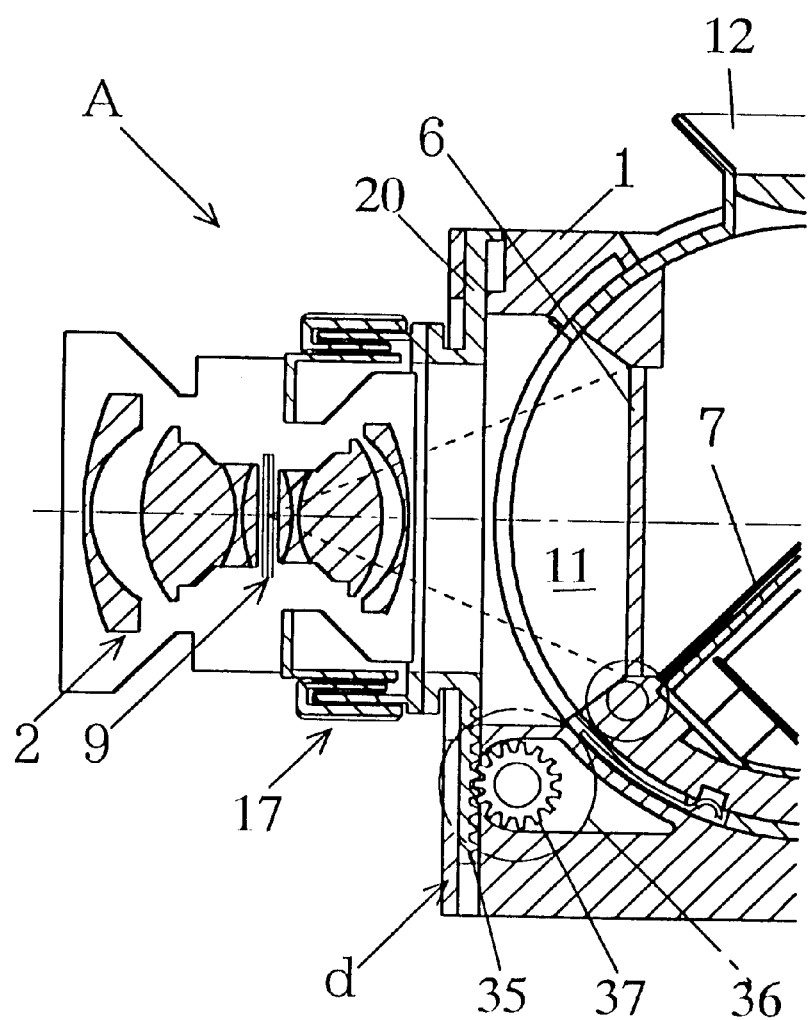
FIG. 12 is a longitudinal sectional side view showing principal parts of a first lens movement mechanism in the camera shown in FIG. 8.

In this second embodiment, a mechanism as shown in FIG. 12 may be employed as another example of the first lens movement mechanism d for shifting the lens unit 2 to the vertical (rise) direction. In this case, a rack gear 35 formed in the holding member 20 holding the lens unit 2 is engaged with a pinion gear 37 rotated by an operating knob 36.

Therefore, the first lens movement mechanism d freely moves the holding member 20 holding the lens unit to the vertical (rise) direction by operating the operating knob 36. Further, a helicoids mechanism may be used as the focusing means 17.

Third Embodiment

Figure 13A:
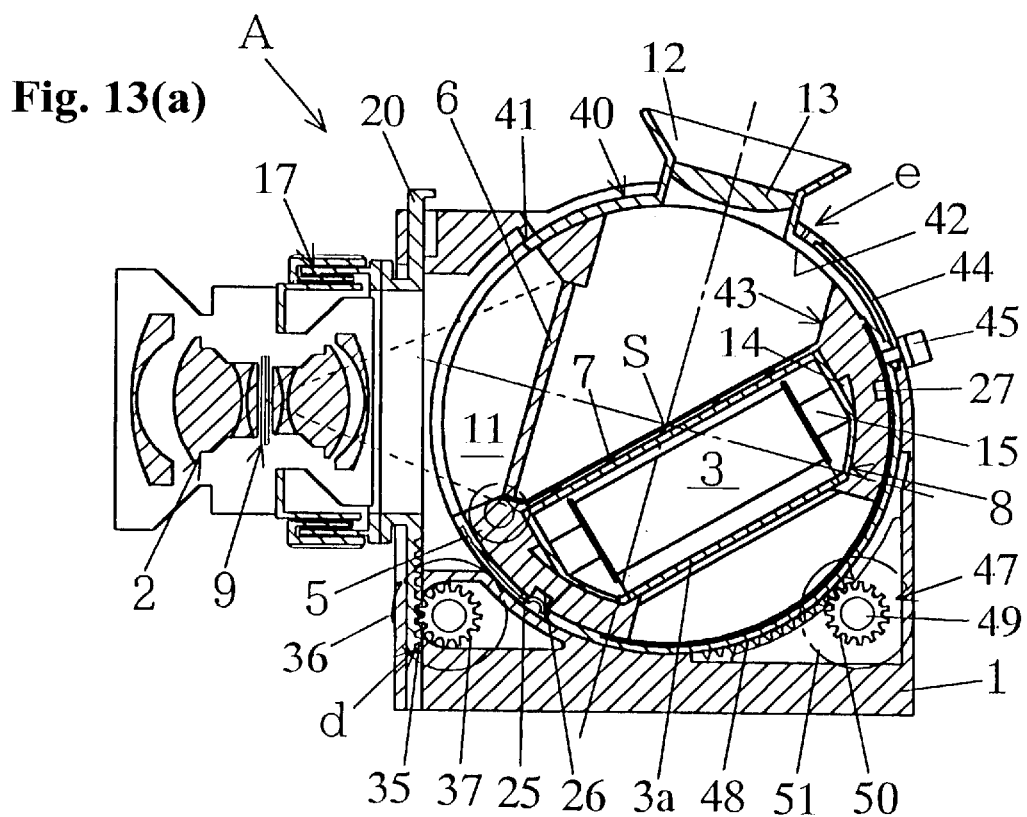
FIGS. 13($a$) and 13($b$) are longitudinal sectional side views showing a camera according to a third embodiment of the present invention.
Figure 13B:
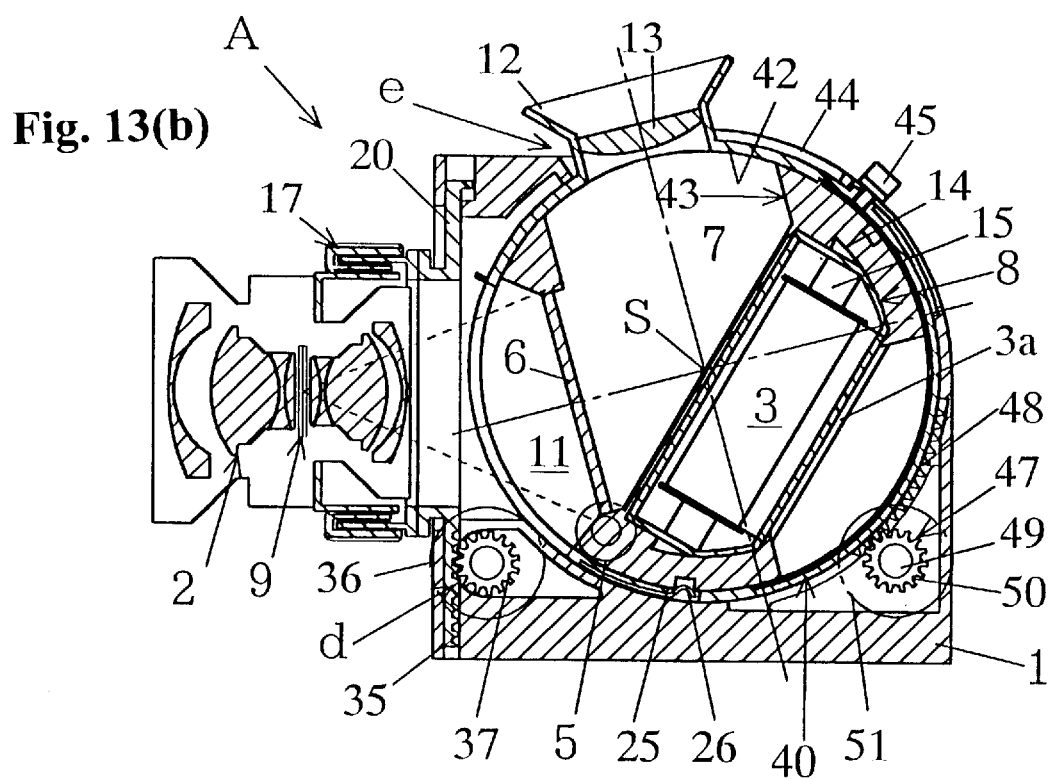
Figure 14:
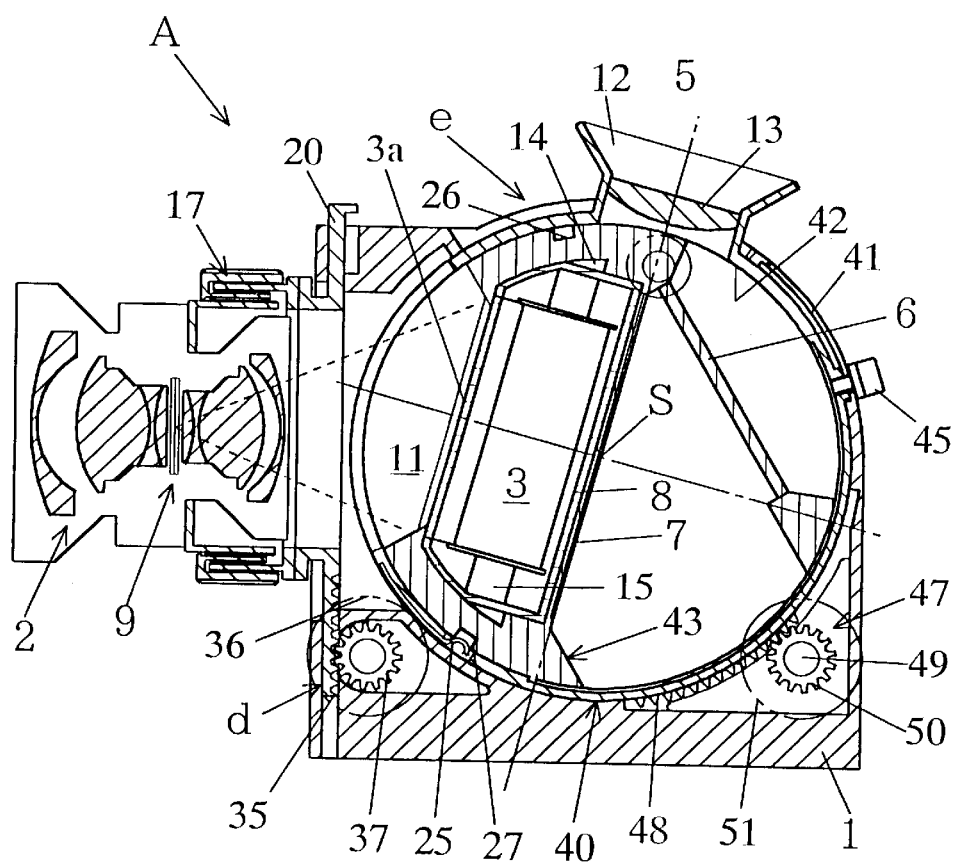
FIG. 14 is a longitudinal sectional side view showing an operating state in the camera shown in FIG. 13.
Figure 15:
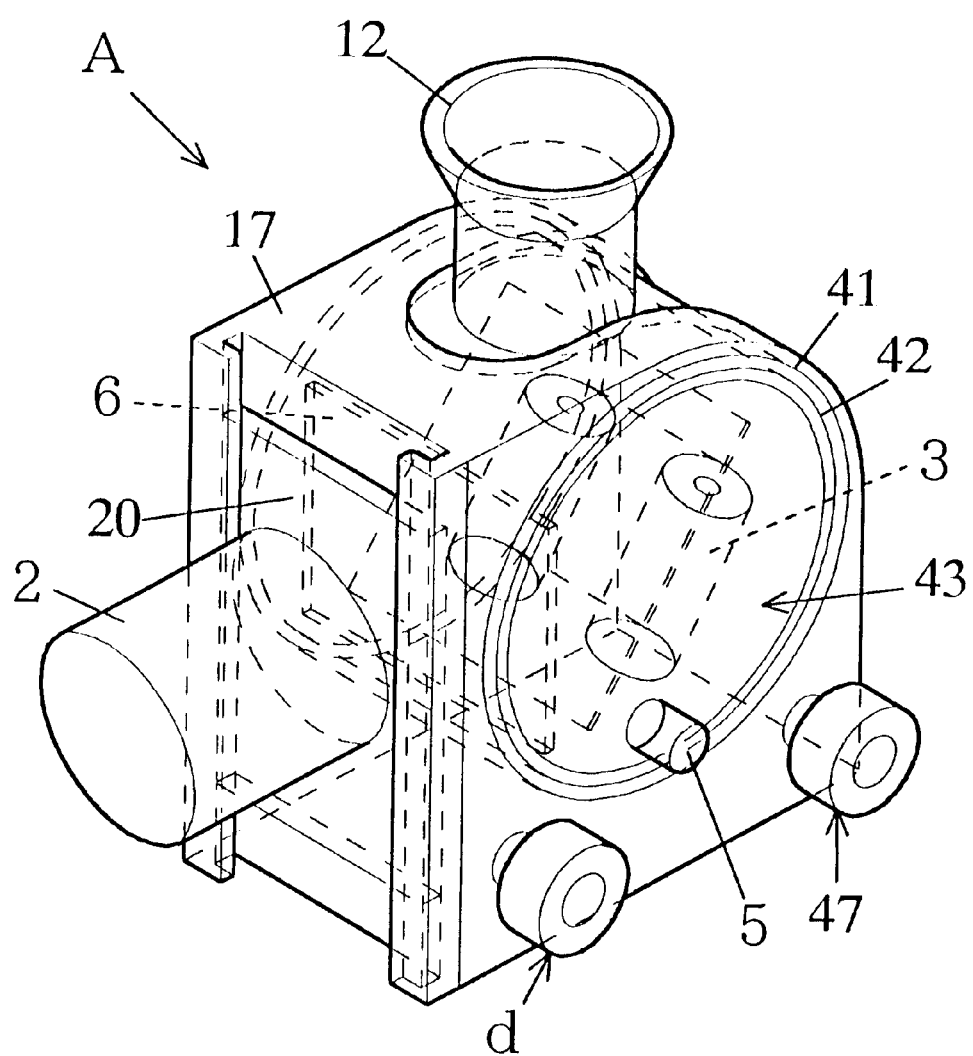
FIG. 15 is a schematic perspective view showing the camera shown in FIG. 13.

Next, FIGS. 13(a), 13(b) and FIG. 14 show a camera A according to a third embodiment of the present invention. In the case where the user determines a composition in the subject photography and carries out a focusing operation, a second lens movement mechanism e for tilt operation is given by rotating a sub-body 40 included in the main body 1.

That is, the second lens movement mechanism e for tilt operation is composed of a sub-body 40, a rotating member 43, an operating means 5, a focusing screen 6, a reflecting member 7 and a case member 8. More specifically, the sub-body 40 is included in the main body 1, and is rotated along a guide 41 of the main body 1 by a rotating means 47. The rotating member 43 is included in the sub-body 40, and is rotated along a sub-guide 42 of the sub-body 40. The operating means 5 is connected with the rotating member 43 so that the rotating member 43 can be rotated. The focusing screen 6 corresponds to the luminous flux section 11 of the lens unit 2 when the user determines a composition in the subject photography and carries out a focusing operation. The reflecting member 7 is mounted to the rear side of the focusing screen 6 in the rotating member 43, and reflects a subject image captured from the lens unit 2 to the finder 12 provided in the sub-body 40. The case member 8 is arranged on the other side of the focusing screen 6 via the reflecting member 7 in the rotating member 43, and contains an image pickup member 3 corresponding to the luminous flux section 11 of the lens unit 2 in the subject photography.

In this case, the sub-body 40 is rotatably moved within a range of a circular arc long slot 44 formed in the main body 1 by a rotating means 47, which will be described later.

Further, the sub-body 40 and the main body 1 are integrally fastened by a fastening member 45 such as a setscrew.

In this third embodiment, the center S of rotation of the sub-body 40 is aligned with the center of rotation of the rotating member 43 in a lens movement (tilt) operation.

The above rotating means 47 rotates the sub-body 40 in the following manner. More specifically, a pinion gear 50 supported to an operating shaft 49 of the main body 1 is engaged with a large gear 48 attached to the sub-body 40, and then, an operating knob 51 attached to the outer end portion of the operating shaft 49 is rotated, and thereby, the sub-body 40 is arbitrarily rotated.

In this case, the operating shaft may be rotated by a drive of electric motor.

Therefore, according to this third embodiment, when the rotating member 43 is operated by the operating means 5 so that the reflecting member 7 is positioned to the luminous flux section 11 side, the focusing screen 6 corresponds to the lens unit 2 side as shown in FIG. 12. In this case, the sub-body 40 is rotated and moved along the circular arc long slot 44 by the rotating means 47. By the above operation, the inclination angle of the focusing screen 6 is changed upwardly with respect to the lens unit 2 as shown in FIG. 13(a), and further, is changed downwardly with respect to there as shown in FIG. 13(b).

By doing so, the user focuses the camera so that a desired image effect can be obtained, while seeing the visible image of the reflecting member 7 via the finder 12, and thereby, a photography condition having a determined depth of field is set up.

After the desired photography condition is set up, in this state, the user closes the shutter 9 of the lens unit, and then, rotates only rotating member 43 by the operating means 5 so that the image pickup member plane 3a of the image pickup member 3 corresponds to the lens unit 2 side.

Moreover, the luminous flux section 11 of the focusing screen 6 previously positioned approximately coincides with the luminous flux section 11 of the image pickup member plane 3a. Therefore, the image set and confirmed via the finder 12 and the image formed on the image pickup member plane 3a are accurately projected.

Then, when the user presses the shutter 9, the subject passed through the lens unit 2 is imaged on the image pickup member plane 3a via a predetermined exposure, and thereby, it is possible to obtain the image having a desired image effect.

In addition, the second lens movement mechanism e of this third embodiment may be used in combination with the first lens movement mechanism comprising the rack gear 35 and the pinion gear 37 as the second lens movement mechanism e by the back tilt operation, as shown in FIGS. 13(a), 13(b).

Further, in the second lens movement mechanism e, as shown in FIG. 16, a movable member 71 is interposed between a main body side plate 70 fixedly attached to one side of the main body 1 and the rotating member 4. The main body side plate 70 and the rotating member 4, that is, the movable member 71 are formed with circular arc slots 72 and 73 having a length corresponding to a rotating range of the rotating member 4, respectively. In this case, the circular arc slots 72 and 73 are concentric with the center S of rotation of the rotating member. The knob-like operating means 5 with male screw is inserted into the circular arc slots 72 and 73, and then, the male screw of the operating means 5 is screwed into a female hole 75 formed in a rotating member side plate 74 provided on one side of the rotating member 4.

Therefore, the rotating member 4 is arbitrarily rotated within a range of the circular arc slots 72 and 73 by operating the operating means 5, and further, the male screw is fastened into the female screw hole 75, and thereby, the rotating member 4 is fixed at an arbitrary position of the main body 1.

Figure 17A:
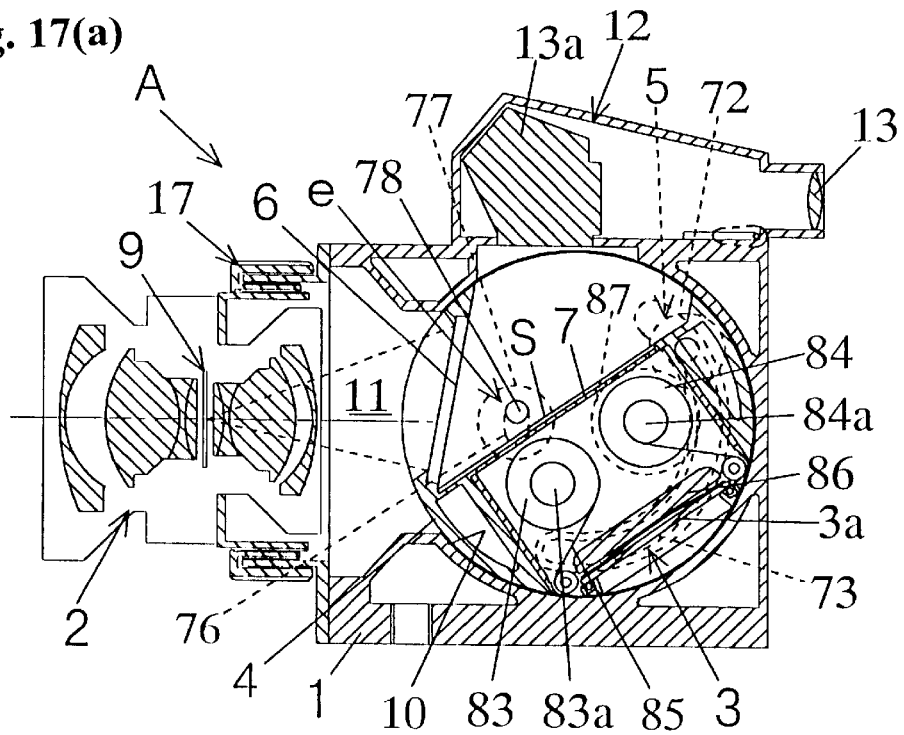
FIGS. 17($a$) and 17($b$) are longitudinal sectional side views showing an operating state by the second lens movement mechanism in the camera shown in FIG. 16.
Figure 17B:
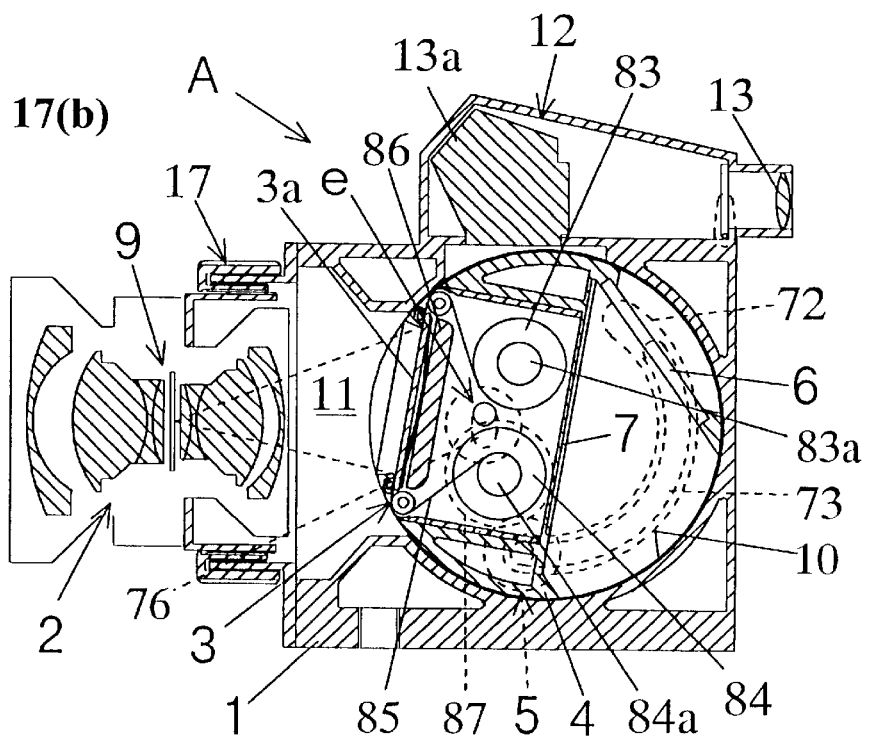

Further, the main body side plate 70 is formed with a circular arc long slot 76 having a length corresponding a range of the above lens movement; in this case, the circular arc long slot 76 is concentric with the center S of rotation of the rotating member. An operating knob 77 with a male screw is inserted into the long slot 76, and thereafter, is screwed into a female screw hole 78 formed in the movable member 71. The movable member 71 is rotated by the operating knob 77 within a range of the long slot 76 30 that a lens movement position can be adjusted, and thereafter, the operating knob 77 is fastened so that the movable member 71 can be fixed. Thus, as shown in FIGS. 17(a), 17(b), photography by the lens movement operation can be carried out.

The second lens movement mechanism e having the above structure is simple as compared with the aforesaid second lens movement mechanism rotating the sub-body 40; therefore, it is possible to manufacture a lightweight camera at a low cost.

Figure 18A:
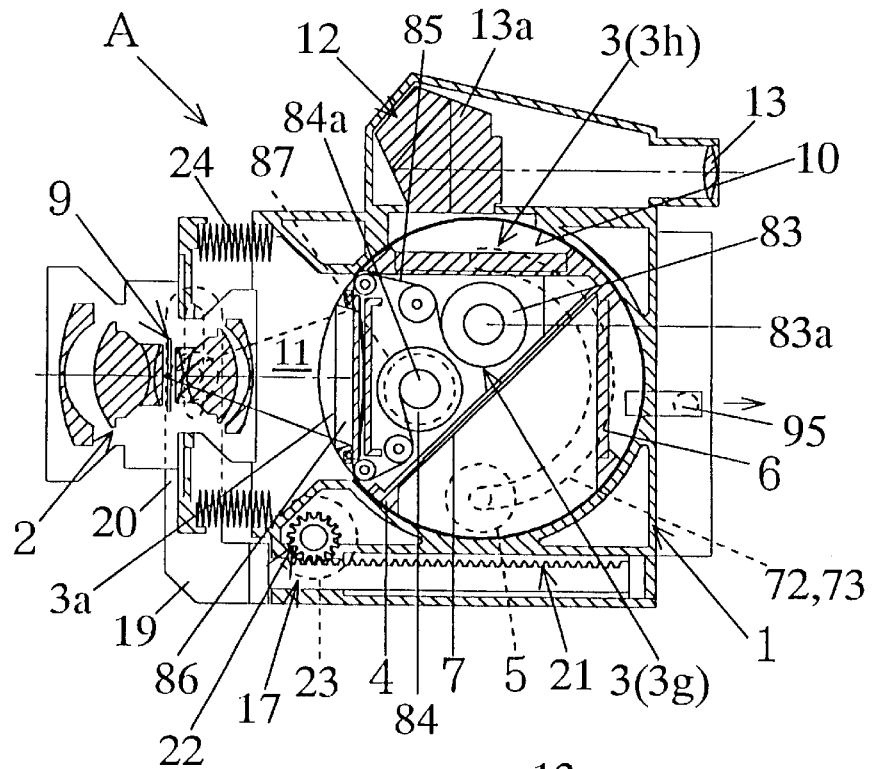
FIGS. 18($a$) and 18($b$) are longitudinal sectional side views showing a state that a plurality of image pickup members is provided in the camera shown in FIG. 1.
Figure 18B:
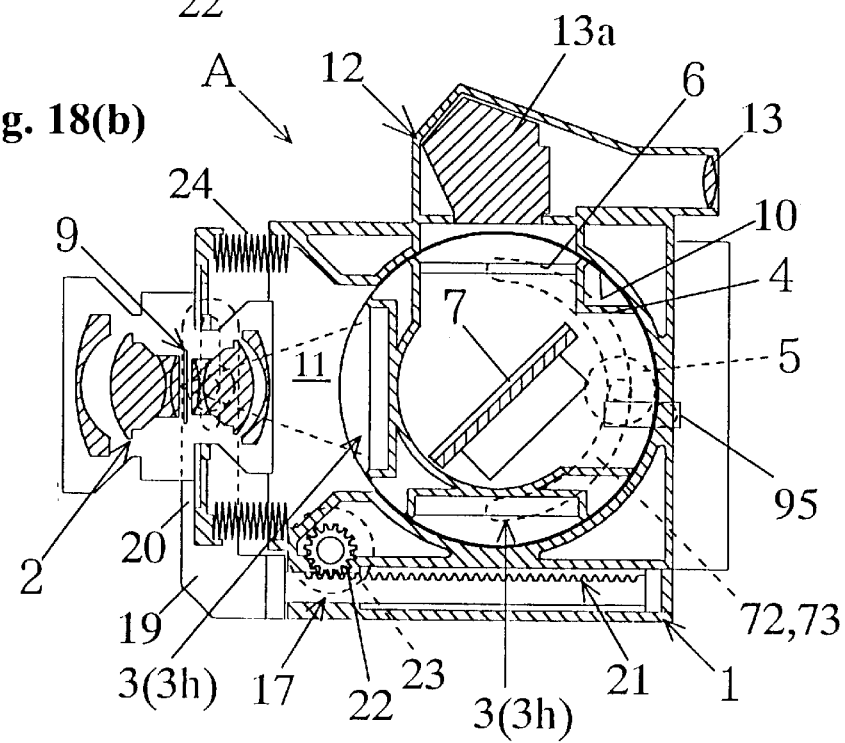

FIGS. 18(a), 18(b) shows a camera A in which a plurality of image pickup members 3 is provided in the rotating member 4 of the main body 1. FIG. 18(a) shows an example in which the image pickup member 3, that is, a silver halide roll film 3 g and a digital image pickup element 3 h are combined with a phase difference of 90° in the center S of rotation of the rotating member 4. FIG. 18(b) shows an example in which two pairs of digital image pickup elements (having the number of pixels having different resolution) 3 h and 3 h are combined with a phase difference of 90° in the center S of rotation of the rotating member 4. The image pickup member 3 is arbitrarily selected in accordance with an image obtained by the photography condition, the subject and the like, and thereafter, makes a correspondence to the luminous flux section 11.

In the case of the image pickup member 3, that is, the roll film 3g shown in FIG. 18(a), the roll film 3g is composed of a feed member (roller) 83, a wind-up member 84, and a film member 85 wound around the feed member 83 and the wind-up member 84, which are contained in the rotating member 4. Further, the rotating member 4 is provided with a film acceptor 86 for giving a predetermined tension to the film member 85 when the image pickup member plane 3a of the film member 85 corresponds to the luminous flux section 11.

In this case, the film member 85 is wound up every photography one frame by an operating member 87 attached to the outer end portion of a shaft 84a of the windup member 84. In FIGS. 18(a), 18(b), a reference numeral 95 denotes a stopper for positioning the rotating member 4 in the rotation.

Fourth Embodiment

Figure 19A:
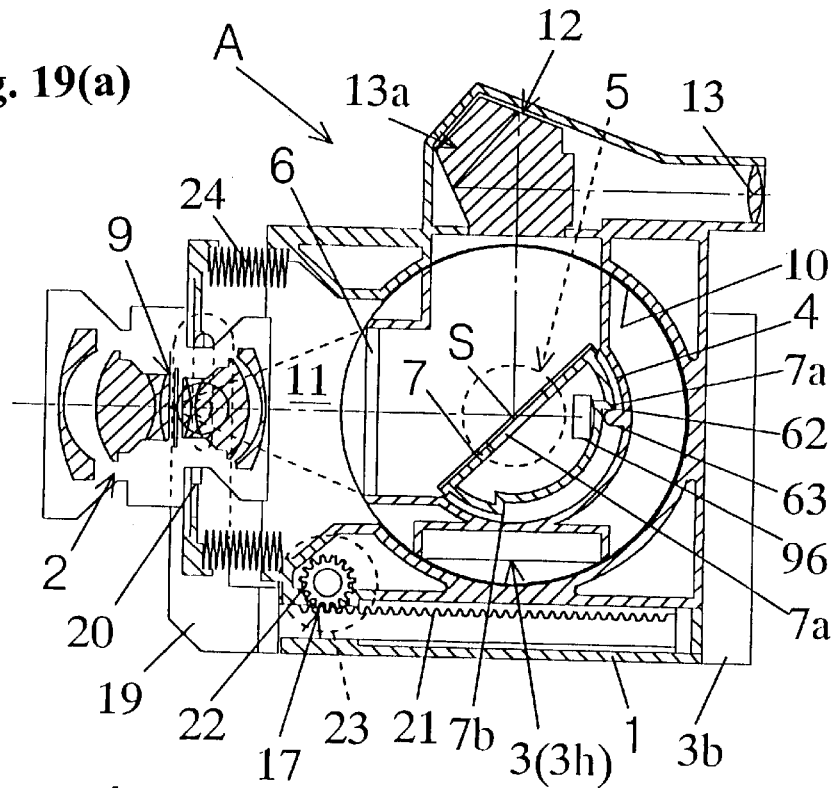
FIGS. 19($a$) and 19($b$) are longitudinal sectional side views showing a camera according to a fourth embodiment of the present invention, and shows the case of an image pickup device type image pickup member.
Figure 19B:
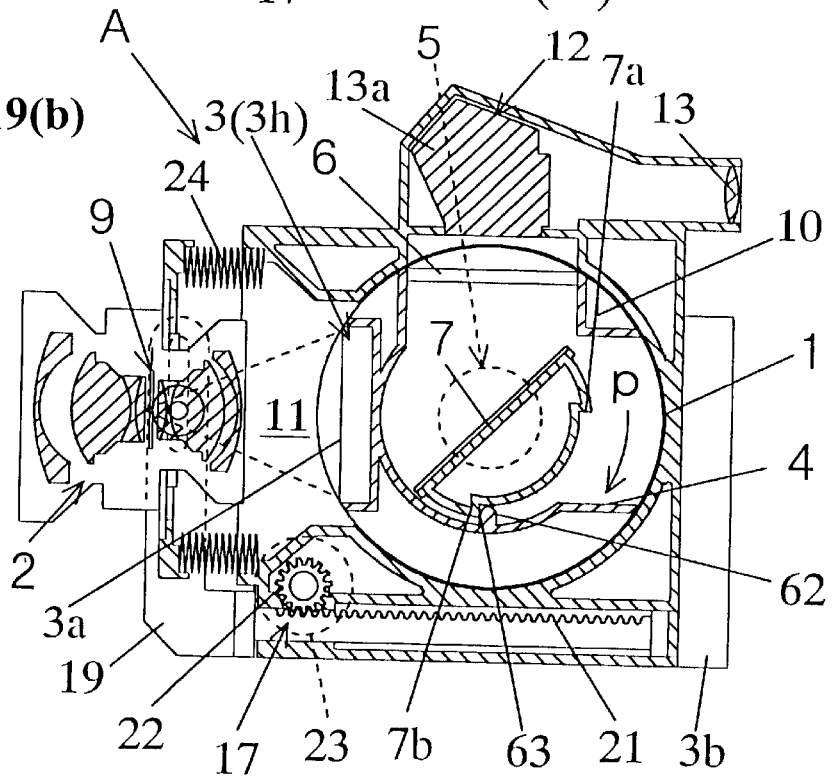

FIGS. 19(a), 19(b) show a camera A according to a fourth embodiment of the present invention. The camera A has a structure in which the reflecting member 7 is mounted to the main body 1 side, a socalled reflecting member fixed type structure.

The camera A having the above structure is composed of a main body 1, a lens unit 2 mounted to the main body 1, and an image pickup member 3 included in the main body 1 and imaging a subject image passing through the lens unit 2 and captured in the main body 1.

Further, the above camera A includes a rotating member 4, an operating means 5, a focusing screen 6, a reflecting member 7 and an image pickup member 3. More specifically, the rotating member 4 is included in the main body 1, and is rotated along a guide 10 of the main body 1. The operating means 5 is connected with the rotating member 4 so that the rotating member 4 can be rotated. The focusing screen 6 corresponds to the luminous flux section 11 of the lens unit 2 when the user determines a composition in the subject photography and carries out a focusing operation. The reflecting member 7 is fixed to the main body 1, and reflects a subject image captured from the lens unit 2 to the finder 12 provided in the main body 1. The image pickup member 3 is provided in the main body 1 so as to correspond to the luminous flux section 11 of the lens unit 2 in the subject photography. In FIGS. 19(*a*), 19(*b*), a reference numeral 3 b denotes a liquid crystal panel for displaying the subject image captured from the lens unit 2.

In addition, the above main body 1, lens unit 2, rotating member 4, operating means 5, and focusing screen 6 basically have the same structure as the above first embodiment. Therefore, the details and effects are omitted by citing the first embodiment, and the identical reference numerals are used to designate the same member.

Moreover, the finder 12 mounted to the main body 1 is a prism type finder which is capable of confirming the subject image of the reflecting member 7 from the eyepiece lens 13 via a prism 13*a* as shown in FIGS. 18(*a*), 18(*b*), FIGS. 19(*a*), 19(*b*), and others. The prism type finder 12 can project the subject image as an erect image in the top and bottom and the right and left of the subject image. The prism type finder 12 is provided with an auxiliary lens group (not shown) between the prism 13*a* and the eyepiece lens 13 in order to accurately confirm the subject image.

The above image pickup member 3, as mentioned above, includes a film having an emulsion layer at one side, an image pickup element such as a semiconductor element converting an optical video signal into an electric signal, a so-called digital camera image pickup element. FIGS. 19(*a*), 19(*b*) show an image pickup element type.

In the fixed type reflecting member 7, in the case where an image pickup element is used as the image pickup member 3, as shown in FIG. 19(*a*), the reflecting member 7 is provided with a semi-transmission reflecting member 7*a* having a semi-transmittance. In this case, the semi-transmission reflecting member 7*a* is provided at a position (the center S of rotation of the rotating member 4) where the center line (i.e., the line X—X in FIG. 1) of the subject image passing through the lens unit 2 is projected on the reflecting member 7. The rear side of the reflecting member 7 is provided with an exposure sensor 96 on the elongated line of the center line (i.e., the line X—X in FIG. 1). Since the image pickup member 3 is formed smaller, a space is taken relatively wide without hindering the rotation of the rotating member 4; therefore, it is possible to readily obtain a space for mounting a control system such as the exposure sensor 96, an auto-focus sensor (not shown) and the like.

Moreover, the sensor 96 is always positioned on the rear side of the reflecting member 7 fixed to the main body when viewing from the finder 12 side; therefore, there is no influence of back incident light from the finder 12.

Accordingly, the camera A of this fourth embodiment makes the following operation. First, the rotating member 4 is rotated along the guide 10 by operating the operating means 5 so that the focusing screen 6 mounted to the rotating member 4 corresponds to the luminous flux section 11 of the lens unit 2. In this case, a rear portion 7*a* of the reflecting member 7 fixed to the main body 1 is abutted against one projected stopper 62 of the rotating member 4, and thereby, as shown in FIG. 19(*a*), the focusing screen 6 is positioned so as to correspond to the luminous flux section 11.

Then, the user focuses the camera by operating the focusing means 17 so that a desired image effect can be obtained, while seeing the image incident from the lens unit 2 and projected on the reflecting member 7 via the focusing screen by the finder 12, and thereby, a photography condition having a determined depth of field is set up.

After the desired photography condition is set up, in this state, the user closes the shutter 9, and then, as shown by an arrow p in FIG. 19(*b*), the rotating member 4 is rotated by the operating means 5 so that the image pickup plane 3*a* of the image pickup member 3 corresponds to the lens unit 2 side. In this case, the rear portion 7*a* of the reflecting member 7 fixed to the main body 1 is abutted against the other projected stopper 63 of the rotating member 4, and thereby, as shown in FIG. 19(*b*), the image pickup member 3 is positioned so as to correspond to the luminous flux section 11.

In this state, when the user presses the shutter, the subject image passed through the lens unit 2 is imaged on the image pickup plane 3*a* via a predetermined exposure, and thereby, it is possible to obtain the image having a desired image effect.

After the photography is completed, the rotating member 4 is rotated to a direction reverse to the arrow p shown in FIG. 19(*b*) so that the focusing screen 6 is positioned so as to correspond to the luminous flux section 11. That is, the rear portion 7*a* of the reflecting member 7 fixed to the main body 1 is abutted against one projected stopper 62 of the rotating member 4, and thereby, the focusing screen 6 is positioned so as to correspond to the luminous flux section 11; therefore, a preparation for the next photography is made.

In this fourth embodiment, the reflecting member 7 is fixed to the main body 1; therefore, when the focusing screen 6 corresponds to the luminous flux section 11, the rear portion 7*a* of the reflecting member 7 is abutted against one projected stopper 62. On the other hand, when the image pickup plane 3*a* corresponds to the luminous flux section 11, the rear portion 7*a* of the reflecting member 7 fixed to the main body 1 is abutted against the other projected stopper 63 of the rotating member 4. By doing so, it is possible to provide a stopper for restricting the rotation of the rotating member 4.

Further, in the case where the rotating member 4 is rotated when a changeover of the correspondence of the focusing screen 6 and the image pickup member 3 to the luminous flux section 11, the reflecting member 7 and the sensor 96 have no rotation. Therefore, it is possible to make the mass of the rotating member 4 as small as possible. Further, a load of rotation by a changeover of the correspondence of the focusing screen 6 and the image pickup member 3 to the luminous flux section 11 is reduced, and thereby, a changeover operation can be speedily carried out.

Fifth Embodiment

Figure 20A:
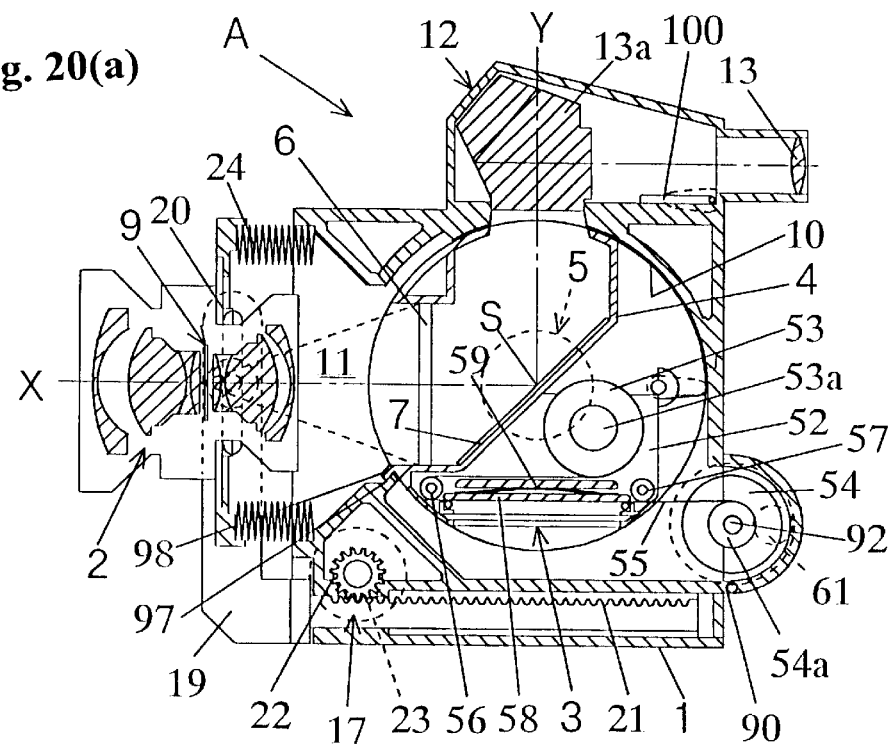
FIGS. 20($a$) and 20($b$) are longitudinal sectional side views showing a camera according to a fifth embodiment of the present invent ion, and shows the case of a roll film type image pickup member.
Figure 20B:
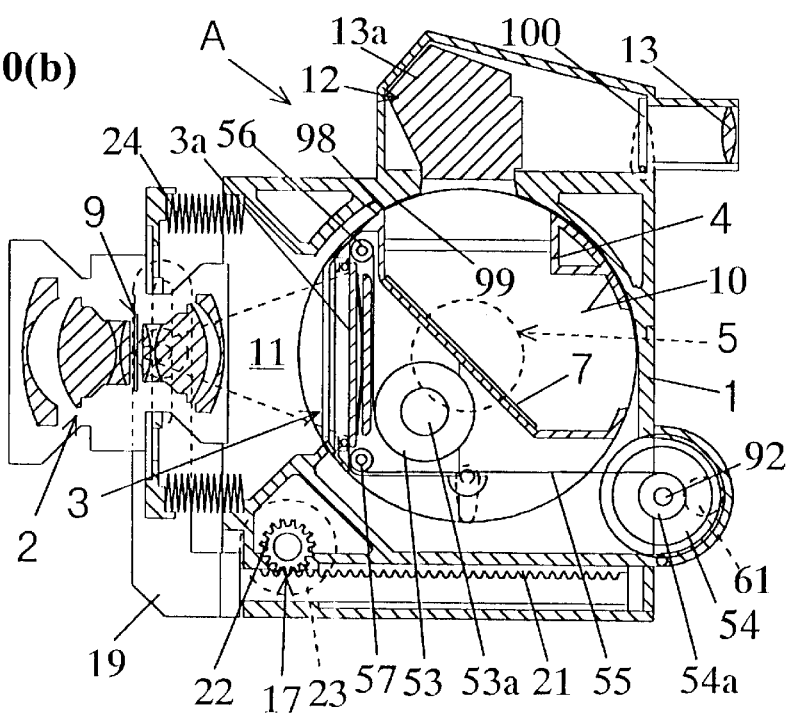
Figure 21:
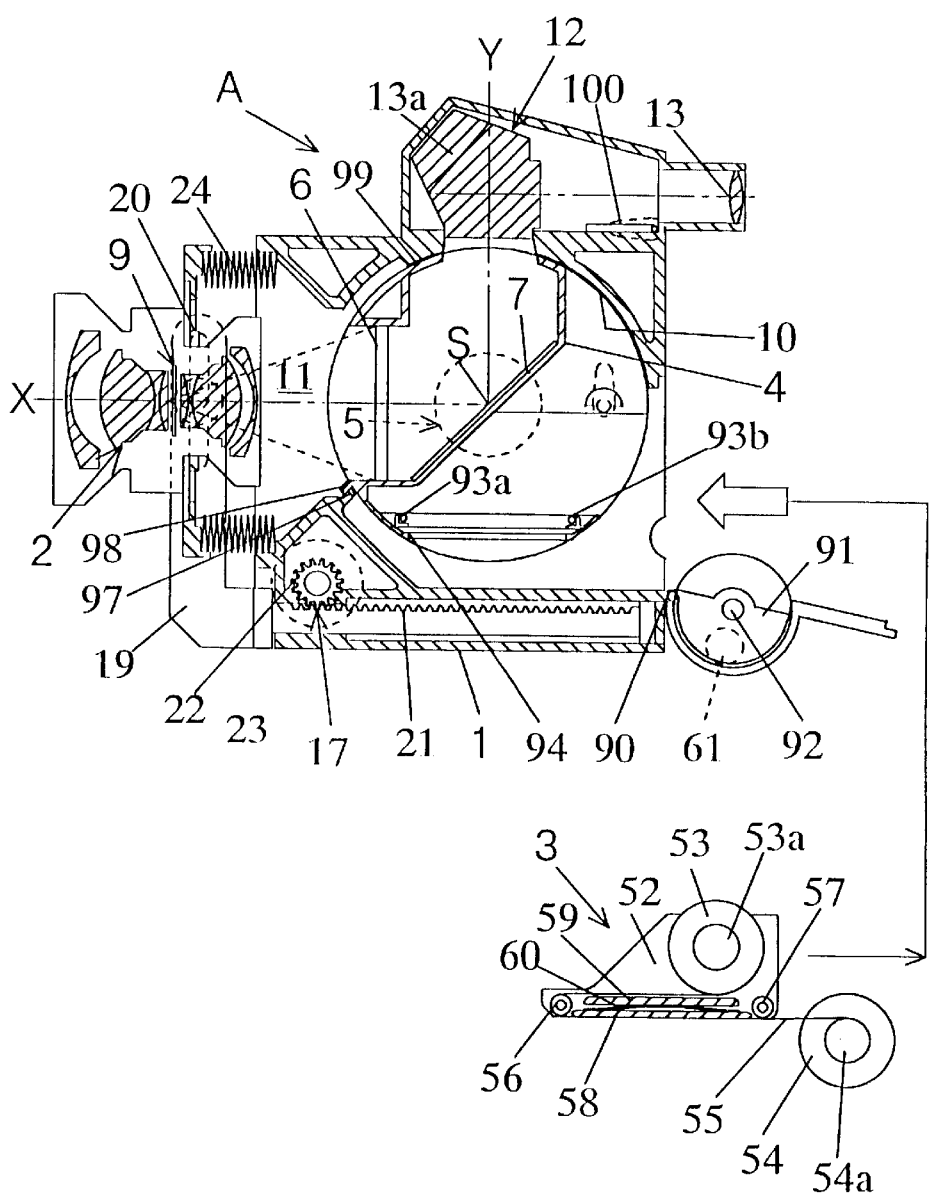
FIG. 21 is a longitudinal sectional side view showing a state that the roll film type image pickup member is mounted in the camera shown in FIG. 20($a$) and 20($b$)

Next, FIGS. 20(*a*), 20(*b*) and FIG. 21 show a camera A according to a fifth embodiment of the present invention. The fifth embodiment shows an example the case where a roll film is used as the image pickup member 3.

That is, in this fifth embodiment, the roll film used as the image pickup member 3 is composed of an attachment member 52, a feed member (roller) 53 provided in the attachment member 52, a wind-up member 54, and a film member 55 wound around the feed member 53 and the wind-up member 54. More specifically, the attachment member 52 is freely removable from the main body 1 with respect to the rotating member 4. The feed member 53 is mounted so as to rotated and move integrally with the rotating member 4; on the other hand, the wind-up member 54 is mounted to the main body 1 so that it can not be moved. In the case of mounting the wind-up member 54 to the main body 1, the wind-up member 54 is mounted to a support member 91 rotatably attached to the rear portion of the main body 1 by a bearing shaft 90 so that it can be freely removable from there. In this case, a shaft 54a is mounted to a wind-up shaft 92 of an operating member 61 attached to the support member 91 so that it can be freely removable therefrom. The wind-up shaft 92 includes a one-direction clutch, and has no rotation except the wind-up time.

In addition, although not illustrated, even if the feed member 53 and the wind-up member 54 are provided in a manner that the feed member 53 is mounted to the main body 1 side; on the other hand, the wind-up member 54 is mounted to the attachment member 52 side, there is no change in the photography effect. Thus, the feed member 53 and the wind-up member 54 can be used as relatively positional change; in this case, the wind-up member 54 is rotated and moved integrally with the rotating member 4.

Moreover, the film member 55 is stretched between the feed member 53 and the wind-up member 54 so as to detour around a pull-out member 56 provided in the attachment member 52, and with the rotation of the rotating member 4. Further, the film member 55 is pulled out of the feed member 53 by an amount required for image pickup (photography) so as to correspond to the luminous flux section 11 of the lens unit 2.

The pullout member 56 is provided at one side portion of the attachment member 52, and is moved together with the rotation of the rotating member 4.

The film member 55 whose terminal end potion is wound around the shaft 53a of the feed member 53 is pulled out of the feed member 53, and thereby, the film member 55 is pulled out by an amount required for image pickup (photography) so as to correspond to the luminous flux section 11 of the lens unit 2.

Further, a film receiver member 58 is provided between the pullout member 56 and a detour member 57. The film receiver member 58 is abutted against the image pickup plane 3a, which is equivalent to at least photography one frame of the film member 55 when the image pickup plane 3a corresponds to the luminous flux section 11. In this case, the pullout member 56 and the detour member 57 are arranged with the same distance from the center S of rotation of the rotating member 4. Further, an internal angle of a triangle formed by connecting the pullout member 56, the detour member 57, and the center S of rotation is approximately 90° on the side of the center S of rotation. Therefore, the film member 55 corresponds to the luminous flux section 11 based on the rotating angle of approximately 90°.

Further, the backside of the image pickup plane 3a of the film member 55 is abutted against one side (outer surface) of the film receiver member 58. On the other hand, the film member fed from the feed member 53 is guided by a guide member 59, and is abutted against the other side (inner surface) of the film receiver member 58. One side (outer surface) of the film receiver member 58 is always elastically urged to the film member 55 side by an elastic member 60 such as spring interposed between the guide member 59 and the film receiver member 58. By doing so, a predetermined tension is given to the pulled film member 55 (image pickup plane 3a); therefore, it is possible to prevent the film member 55 from being loosened and distorted.

Further, as shown in FIG. 21, a pair of press rollers 93a and 93b is provided as means for preventing the above loosening and distortion of the film member 55. The pair of press rollers 93a and 93b is arranged at the position corresponding to the pullout member 56 and the detour member 57, and is abutted against the outer surface (image pickup plane 3a) of the film member 55 so that the film member 55 can be pressed against the film receiver member 58. In addition, a predetermined-size light shield mask member 94 is mounted to the rotating member 4 at the outer side of the pair of press rollers 93a and 93b. The light shield mask member 94 restricts and shields an exposure range to the image pickup plane 3a. Therefore, a flatness of the image pickup plane 3a can be secured.

A wind-up shaft 92 connected to the shaft 54a of the wind-up member 54 is provided with a one-direction clutch (not shown). As shown in FIG. 20(b), when the film member 55 corresponds to the luminous flux section 11 of the lens unit 2 by the rotation of the rotating member 4 by the operating means 5, the shaft 54a is in a fixed state; on the other hand, the shaft 53a of the feed member 53 is freely rotated to a direction pulling out the film member 55. Therefore, the film member 55 equivalent to photography one frame is pulled out by the pullout member 56.

Further, in the case of winding up the photographed film member 55, the shaft 53a of the feed member 53 is in a fixed state. Thus, when the shaft 54a is rotated by the operating member 61 attached to the outer end portion of the shaft 54a of the wind-up member 54, the film member 55 having the image pickup plane 3a corresponding to the luminous flux section 11 is wound. Simultaneously, the rotating member 4 is rotated by a tensile force given to the film member detouring the pullout member 56, and then, as shown in FIG. 20 (a), the rotating member 4 is stopped at the position where the focusing screen 6 provided in the rotating member 4 corresponds to the luminous flux section 11. Then, the wind-up of photography one frame of the film member is completed.

Therefore, in the case of the roll film type image pickup member 3 according to the fifth embodiment, first, the rotating member 4 is rotated along the guide 10 by operating the operating means 5 so that the focusing screen 6 mounted to the rotating member 4 corresponds to the luminous flux section 11 of the lens unit 2. In this case, a projected portion 98 of the rotating member 4 is abutted against a stopper member 97 on the lower side of the luminous flux section 11 in the main body 1, and thereby, as shown in FIG. 20(a), the focusing screen 6 is positioned so as to correspond to the luminous flux section 11.

Then, the user focuses the camera by operating the focusing means 17 so that a desired image effect can be obtained, while seeing the image incident from the lens unit 2 and projected on the reflecting member 7 via the focusing screen by the finder 12, and thereby, a photography condition having a determined depth of field is set up.

After the desired photography condition is set up, in this state, the user closes the shutter 9. Then, as shown in FIG. 20(b), the rotating member 4 is rotated by the operating means 5 so that the image pickup plane 3a of the film member 55 in the image pickup member 3 corresponds to the lens unit 2 side (process for pulling out the film member 55). In this case, the projected portion 98 of the rotating member 4 is abutted against a stopper member 99 on the upper side of the luminous flux section 11 in the main body 1, and thereby, as shown in FIG. 20 (b), the image pickup plane 3a is positioned so as to correspond to the luminous flux section 11.

That is, when the film member 55 is rotated to the luminous flux section 11 side, the pullout member 56 mounted to the rotating member 4 is rotated and moved together with the rotation of the rotating member 4, and then, the film member 55 is pulled out of the feed member 53 with the rotation of the shaft 53a. In this case, the shaft 54a of the wind-up member 54 has no rotation by the one-direction clutch; therefore, the film member 55 is not erroneously pulled out of the wind-up member 54 side. Further, the film receiver member 58 mounted to the rotating member 4 (attachment member 52) is arranged so that the backside of the image pickup plane 3a corresponds to the luminous flux section 11. In addition, the backside of the image pickup plane 3a is closely abutted against the film receiver member 58 by the elastic member 60, so that a predetermined tension can be applied to the image pickup plane 3a; therefore, it is possible to prevent the film member 55 from being loosened and distorted.

When the rotating member is rotated by a predetermined rotating angle (e.g., 90°), the detour member 57 positioned in FIG. 20(a) is rotated and moved by the position of the pullout member 56 in FIG. 20(a). That is, when the detour member 57 reaches the position shown in FIG. 20(b), the image pickup plane 3a of the film member 55 pulled by a length (equivalent to one frame) corresponding to a dimension of the luminous flux section 11 corresponds to the luminous flux section 11. In this state, when the user presses the shutter, the subject image passed through the lens unit 2 is imaged on the image pickup plane 3a via a predetermined exposure, and thereby, it is possible to obtain the image having a desired image effect.

In the case where there is a possibility that a light is incident on the image pickup plane 3a in the rotating member from the finder 12, and is erroneously exposed, an inverted incident light preventive member 100 may be additionally provided in the vicinity of the eyepiece lens 13 of the finder 12. The inverted incident light preventive member 100 is provided so as to freely rise up and down, and thereby, it is not an obstacle when the user focuses the camera and determines the composition.

After the photography is completed, the rotating member 4 is rotated from the state shown in FIG. 20(b) to the state shown in FIG. 20(a) so that the focusing screen 6 corresponds to the luminous flux section 11.

In this case, the shaft 53a of the feed member 53 is fixed manually or automatically. When the shaft 54a is rotated by the operating member 61 attached to the outer end portion of the wind-up shaft 92 connected to the shaft 54a of the wind-up member 54, the image pickup plane 3a corresponding to the luminous flux section 11 is wound by one frame. Simultaneously, the rotating member 4 is rotated by a tensile force to the film member 55 detouring the pullout member 56, and the focusing screen 6 provided in the rotating member 4 is soon positioned so as to correspond to the luminous flux section 11. Thus, a preparation for the next photography is made.

Sixth Embodiment

Next, FIGS. 22(a)–22(c) and FIG. 23 show a camera A according to a sixth embodiment of the present invention.

The camera A of this sixth embodiment has a structure in which the rotating member 4 is rotatably mounted to the main body 1 via a bearing shaft 65, and the correspondence of the focusing screen 6 and the image pickup member 3 to the luminous flux section 11 is changed by a selective rotation of the rotating member 4.

More specifically, one end portion of an L-shaped link 67 is rotatably mounted to an attachment member 66 provided on the upper portion of the main body 1 via the bearing shaft 65, and the rotating member 4 is rotatably mounted to the other end portion of the link 67 by a rotary shaft 68.

Figure 22A:
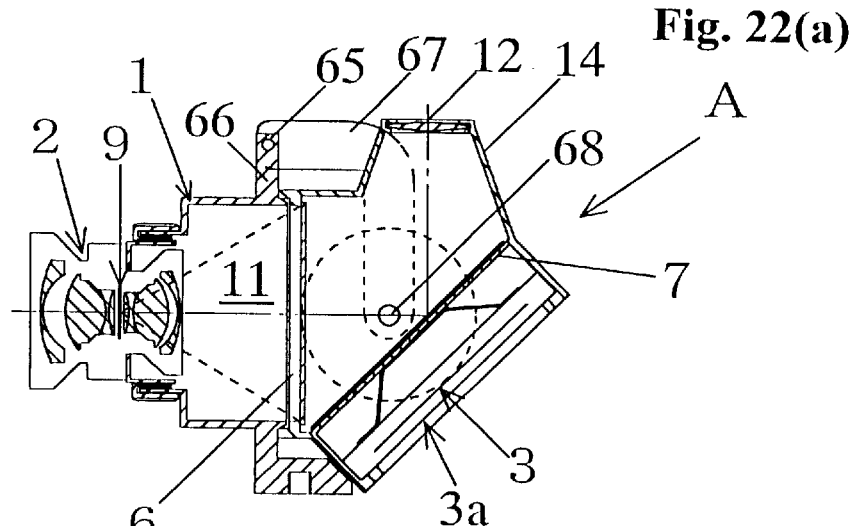
FIGS. 22($a$)–22(c) are longitudinal sectional side views showing a camera according to a sixth embodiment of the present invention.
Figure 22B:
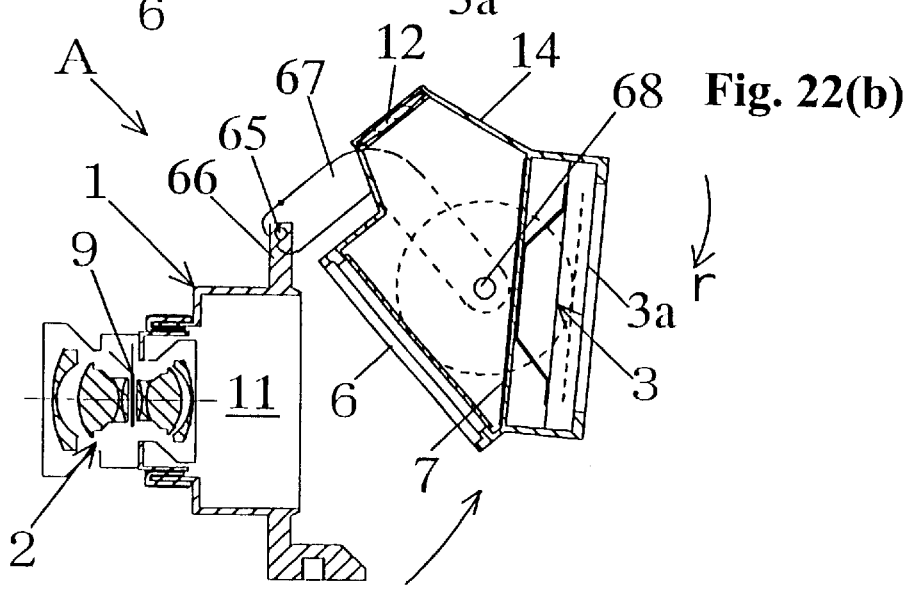
Figure 22C:
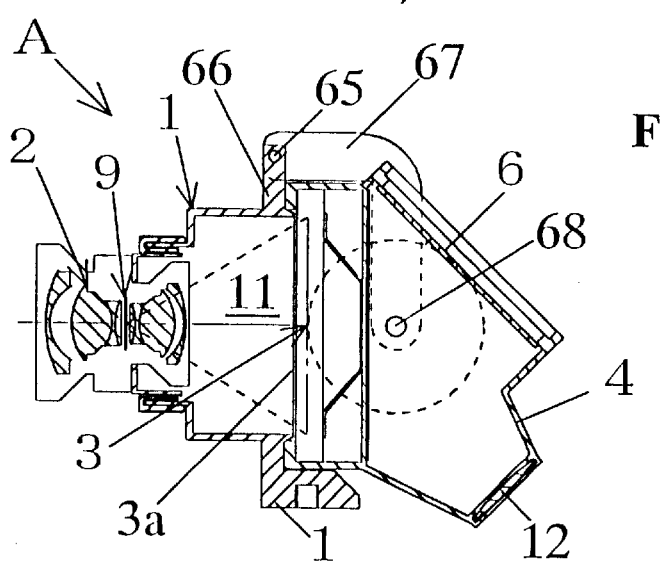
Figure 23:
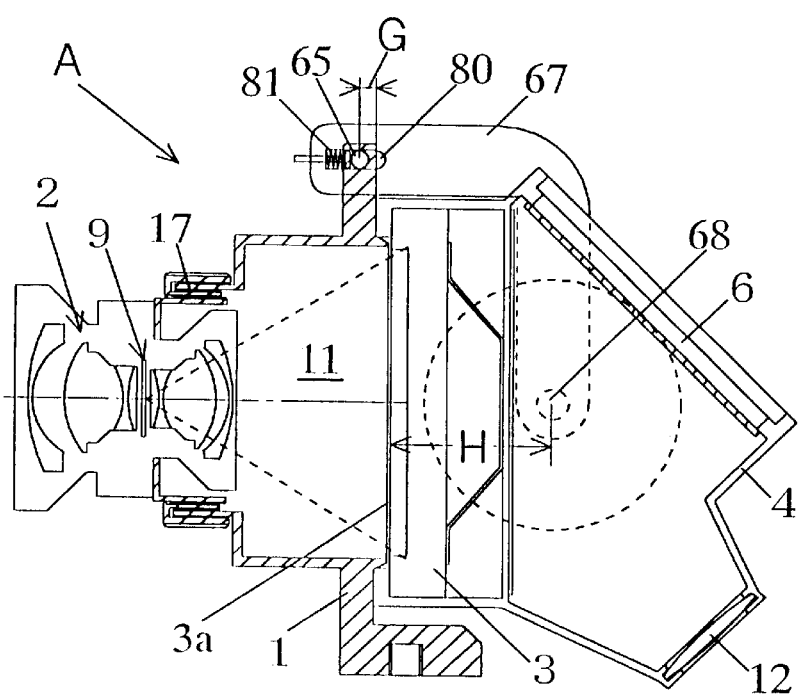
FIG. 23 is a longitudinal sectional side view showing another in FIGS. 22($a$)–22(c); example in which a rotating member is mounted in the camera shown

Therefore, as shown in FIG. 22(a), in a state that the focusing screen 6 corresponds to the luminous flux section 11, the user determines the subject composition and focuses the camera on an optical path from the lens unit 2 via the focusing screen 6, the reflecting member 7, and the finder 12. Thereafter, when the rotating member 4 is left up, the rotating member 4 is upwardly rotated around the bearing shaft 65 together with the link 67 as shown in FIG. 22(b). In this state, the rotating member 4 is rotated around the rotary shaft 68 to a direction shown by an arrow r by an angle of approximately 180°, that is, is rotated from a state shown in FIG. 22(b) to a state shown in FIG. 22(c). Thereafter, the image pickup plane 3a of the image pickup member 3 directed outwardly is moved inwardly so that the image pickup plane 3a corresponds to the luminous flux section 11, and thereby, the subject can be photographed at once.

According to the above structure, the outer peripheral portion of the rotating member 4 is not covered with the main body 1; therefore, it is possible to form the camera A into a compact size.

Further, the focusing screen 6 and the exposure plane (image pickup plane 3a) of the image pickup member 3 are inverted so that they can be pressed into the plane identical to the luminous flux section 11; therefore, the focusing screen 6 and the image pickup member 3 can be positioned with a high accuracy.

In this sixth embodiment, the image pickup member 3 has a change in a dimension, that is, a distance H from the position of the center of rotation (rotary shaft 68) of the rotating member 4 to the focusing screen 6 and the image pickup plane 3a of the image pickup member 3 in the luminous flux section 11. However, in this case, a long slot 80 is formed at one end portion of the link 67 mounted to the bearing shaft 65 of the attachment member 66, and the bearing shaft 65 is fitted into the long slot 80. Further, the long slot 80 is provided with an elastic member 81 such as spring, which always urges the main body 1 to a direction abutting against the luminous flux section 11 side. Therefore, the change of the distance H is corrected in an adjusting movable range G of the long slot 80 so that the image pickup plane 3a securely corresponds to the luminous flux section 11; as a result, a suitable correction can be made even if there is a variation in the dimensional accuracy of each member.

Figure 24:
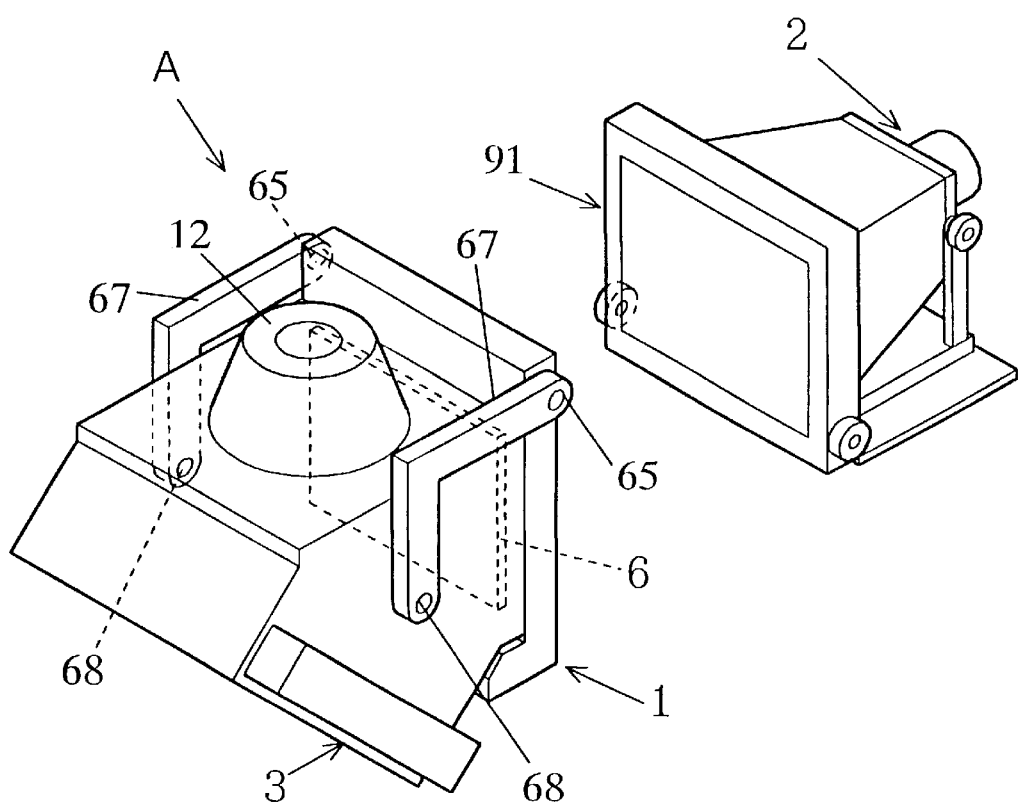
FIG. 24 is an exploded perspective view showing a lens member unit in the camera shown in FIGS. 22($a$)–22(c)
Figure 25A:
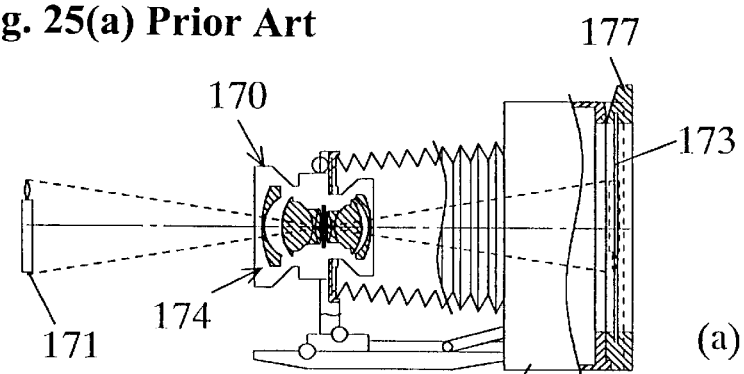
FIGS. 25($a$)–25(c) are longitudinal sectional side views showing a composition and focusing state in a conventional camera.
Figure 25B:
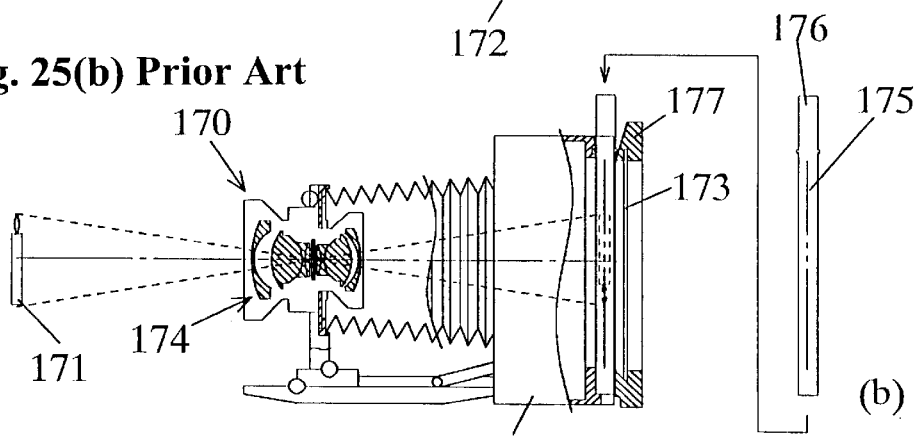
Figure 25C:
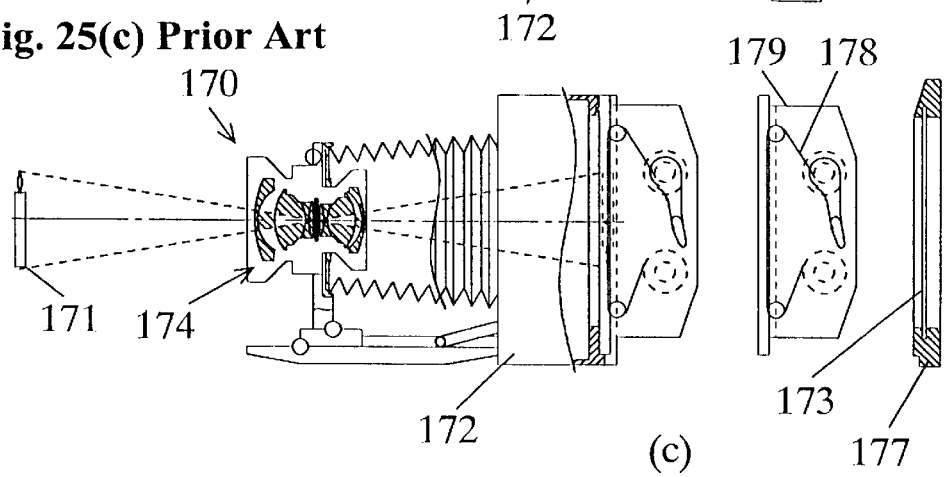
Figure 26A:
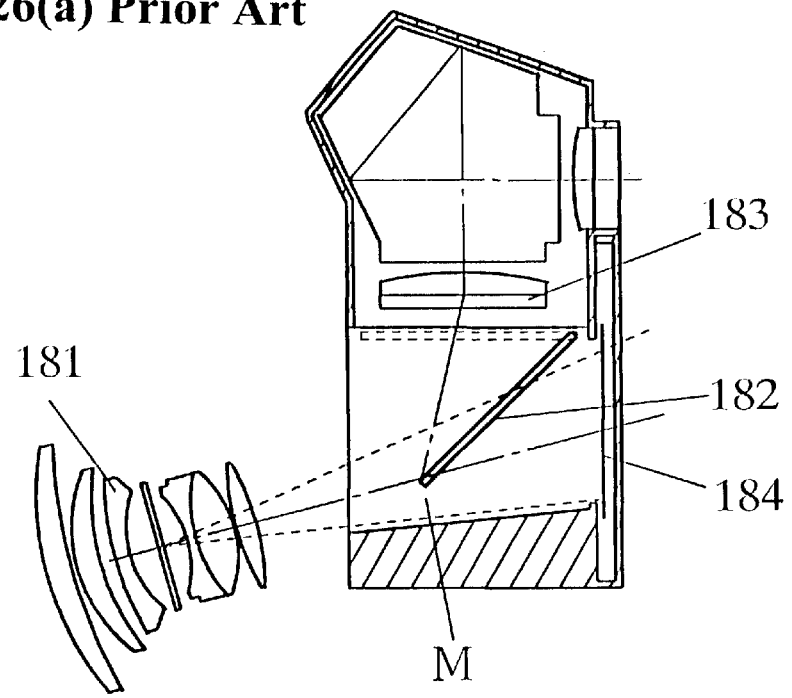
FIGS. 26($a$) and 26($b$) are longitudinal sectional side views showing each lens movement operating state in the conventional camera.
Figure 26B:
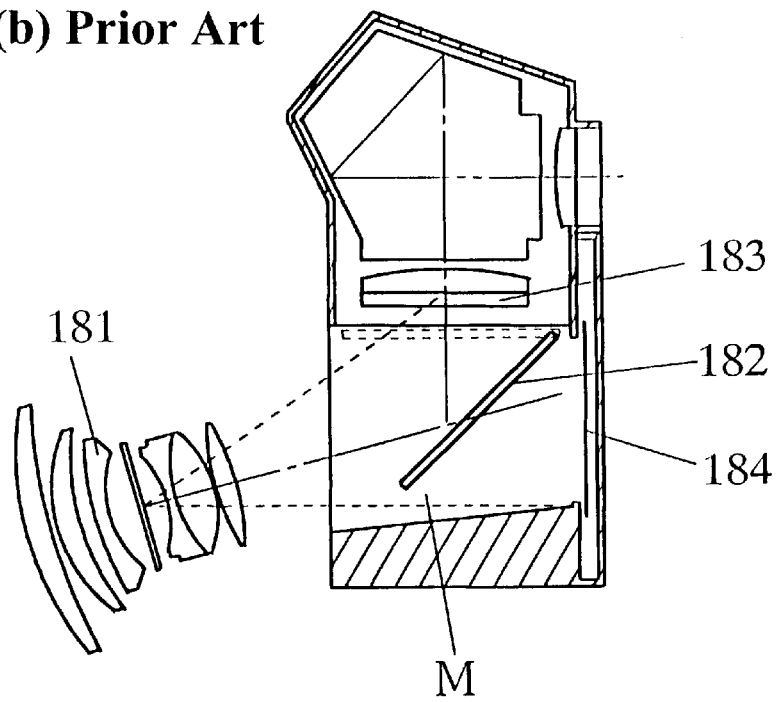

In this sixth embodiment, the main body 1 mounted with the rotating member 4 is provided so that it can be freely attached to and detached from the lens unit 2. Further, as shown in FIG. 24, a lens frame body 91 (technical view camera, etc.) with existing lens movement mechanism may be selectively mounted and used.

What is claimed is:

1. A camera comprising:
   a main body;
   a lens unit mounted to one side of the main body;
   a focusing screen projecting a subject image passing through the lens unit; and an image pickup member included in the main body, and imaging the subject image captured in the main body passing through the lens unit, the focusing screen and the image pickup member being mounted to a rotating member rotatably provided in the main body with a phase difference, the focusing screen corresponding to a luminous flux section of the lens unit when determining a composition of subject photography and carrying out a focusing operation, the focusing screen being separated from the luminous flux section of the lens unit so that the image pickup member corresponds to the luminous flux section of the lens unit in the subject photography, the focusing screen and the image pickup member selectively moved by a rotation of the rotating member being positioned to an approximately identical plane when they correspond to the luminous flux section of the lens unit.

2. The camera according to claim 1, wherein the image pickup member is a roll film, which is composed of a feed member, a wind-up member, and a film member wound around the feed member and the wind-up member, the feed member is mounted in the rotating member or to the main body; on the other hand, the wind-up member is mounted to the main body or in the rotating member, and the film member stretched between the feed member and the wind-up member is set so as to detour around a pullout member provided in the rotating member, and is pulled out of the feed member by an amount required for photography with a rotation of the rotating member so as to correspond to the luminous flux section of the lens unit.

3. The camera according to claim 1, wherein the lens unit mounted to the one side of the main body is provided with a first lens movement mechanism for shifting the lens unit to a vertical or a front and back direction.

4. The camera according to claim 1, further including a second lens movement mechanism by a tilt operation, the second lens movement mechanism comprising:
  a sub-body provided in the main body and rotating along a guide of the main body, said rotating member provided in the sub-body and rotating along a guide of the sub-body, said focusing screen and image pickup member being mounted in the rotating member;
  an operating means connected to the rotating member and rotating the rotating member; and
  a reflecting member mounted to a rear side of the focusing screen in the rotating member, and reflecting the subject image captured from the lens unit to a finder provided in the sub-body,
  the image pickup member being provided at the other one side opposite to the focusing screen relative to the reflecting member so as to correspond to the luminous flux section of the lens unit in the subject photography.

5. The camera according to claim 1, further including:
a reflecting member mounted fixedly to the main body, and reflecting the subject image captured from the lens unit to a finder provided in the main body; and
a second lens movement mechanism by a tilt operation, the second lens movement mechanism comprising:
a main body side plate mounted to one side of the main body;
a movable plate rotatably interposed between the main body side plate and one side of the rotating member;
a circular arc slot formed in each of the main body side plate and the rotating member so as to correspond to a rotating range of the rotating member;
an operating means connected to the rotating member and rotating the rotating member having a male screw inserted into the circular arc slot, and screwed into a female screw hole formed on a rotating member side plate provided at one side of the rotating member;
a circular arc long slot formed in the main body side plate and having a length corresponding to a lens movement range; and
an operating knob inserted into the circular arc long slot and screwed into a movable member female screw hole formed in the movable member.

6. The camera according to claim 1, wherein a plurality of image pickup members is mounted to the rotating member.

7. A camera comprising:
a main body;
a lens unit mounted to one side of the main body;
an image pickup member included in the main body, and imaging a subject image captured in the main body passing through the lens unit;
a rotating member provided in the main body and rotating along a guide of the main body;
an operating means connected to the rotating member and rotating the rotating member;
a focusing screen mounted to the rotating member, and corresponding to a luminous flux section of the lens unit when determining a composition of subject photography and carrying out a focusing operation; and
a reflecting member provided in the rotating member and reflecting the subject image captured from the lens unit to a finder provided in the main body,
the image pickup member being provided at one side opposite to the focusing screen relative to the reflecting member so as to correspond to the luminous flux section of the lens unit in a subject photography,
the reflecting member being mounted to either of the main body or the rotating member.

8. A camera comprising:
a main body;
a lens unit mounted to one side of the main body;
a rotating member rotatably mounted to a bearing shaft provided in the main body;
an image pickup member provided in the rotating member, and imaging a subject image captured in the rotating member passing through the lens unit;
a focusing screen provided in the rotating member, and corresponding to a luminous flux section of the lens unit when determining a composition of subject photography and carrying out a focusing operation; and
a reflecting member mounted to a rear side of the focusing screen in the rotating member, and reflecting the subject image captured from the lens unit to a finder provided in the rotating member,
the image pickup member being provided at one side opposite to the focusing screen relative to the reflecting member so as to correspond to the luminous flux section of the lens unit in the subject photography.

* * * * *